(12) United States Patent
Okuda et al.

(10) Patent No.: US 7,751,297 B2
(45) Date of Patent: Jul. 6, 2010

(54) OPTICAL PICKUP DEVICE

(75) Inventors: Takuya Okuda, Kyoto (JP); Hiroaki Yamamoto, Hyogo (JP); Naoki Nakanishi, Shiga (JP); Masahiko Nishimoto, Osaka (JP); Naoto Shimada, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/303,578

(22) PCT Filed: Sep. 6, 2007

(86) PCT No.: PCT/JP2007/067422

§ 371 (c)(1),
(2), (4) Date: Dec. 5, 2008

(87) PCT Pub. No.: WO2008/075484

PCT Pub. Date: Jun. 26, 2008

(65) Prior Publication Data
US 2010/0014411 A1 Jan. 21, 2010

(30) Foreign Application Priority Data
Dec. 18, 2006 (JP) ............................. 2006-339617
Jun. 22, 2007 (JP) ............................. 2007-164510

(51) Int. Cl.
*G11B 7/00* (2006.01)
(52) U.S. Cl. ................................. 369/112.07; 369/44.37
(58) Field of Classification Search ............ 369/112.02, 369/112.05, 44.23, 44.37, 44.41, 112.07
See application file for complete search history.

(56) References Cited

U.S. PATENT DOCUMENTS

| 4,775,968 | A | 10/1988 | Ohsato |
| 2004/0081064 | A1 | 4/2004 | Ohnishi et al. |
| 2005/0030877 | A1* | 2/2005 | Horiyama ............. 369/112.05 |
| 2005/0276206 | A1 | 12/2005 | Katayama |
| 2007/0133374 | A1* | 6/2007 | Arai ...................... 369/112.05 |
| 2008/0062825 | A1* | 3/2008 | Arai et al. ............... 369/44.14 |
| 2009/0022032 | A1* | 1/2009 | Kawasaki et al. ....... 369/109.02 |

FOREIGN PATENT DOCUMENTS

| EP | 0 762 396 A1 | 3/1997 |
| EP | 1 686 573 A2 | 8/2006 |
| JP | 2004-145915 | 5/2004 |
| JP | 2005-353187 | 12/2005 |

(Continued)

OTHER PUBLICATIONS

European Supplementary Search Report issued in European Patent Application No. EP 07 80 6863, dated Dec. 29, 2009.

*Primary Examiner*—Thang V Tran
(74) *Attorney, Agent, or Firm*—McDermott Will & Emery LLP

(57) ABSTRACT

A pickup device includes a diffraction grating 12 for separating a light beam emitted from the light source into at least three light beams. The diffraction grating 12 is divided into four regions by straight lines extending in a direction parallel to a tangential direction of tracks of an optical information recording medium. A periodic structure of a second region 12B has a phase difference of approximately 180 degrees from a periodic structure of a third region 12C, and a periodic structure of a first region 12A has a phase difference of approximately 180 degrees from a periodic structure of a fourth region 12D.

10 Claims, 19 Drawing Sheets

FOREIGN PATENT DOCUMENTS

| | | |
|---|---|---|
| JP | 2006-228304 | 8/2006 |
| JP | 2007-035193 | 2/2007 |
| JP | 2007-042252 | 2/2007 |
| JP | 2007-122779 | 5/2007 |
| JP | 2007-141425 | 6/2007 |

* cited by examiner

PHASE DIFFERENCE OF PERIODIC STRUCTURE BETWEEN
FIRST REGION AND SECOND REGION (DEGREES)

WIDTH (W1+W2) / EFFECTIVE BEAM DIAMETER (%)

OPTICAL PICKUP DEVICE

RELATED APPLICATIONS

This application is the U.S. National Phase under 35 U.S.C. §371 of International Application No. PCT/JP2007/067422, filed on Sep. 6, 2007, which in turn claims the benefit of Japanese Application No. 2006-339617, filed on Dec. 18, 2006 and Japanese Application No. 2007-164510, filed on Jun. 22, 2007, the disclosures of which Applications are incorporated by reference herein.

TECHNICAL FIELD

The invention relates to an optical pickup device that is used in an optical information processor for performing processing such as recording of information onto an optical information recording medium and playback or erasure of information recorded on the optical information recording medium.

BACKGROUND ART

Reading recorded information from an optical information recording medium (optical disc) such as a CD (Compact Disc) and a DVD (Digital Versatile Disc) is conducted by converging a light beam emitted from a light source such as a semiconductor laser device on a recording track of the optical disc by using an objective lens and converting reflected light from the optical disc to an electric signal by a photodetector. In order to accurately converge a light beam on a desired recording track of a rapidly spinning optical disc, a focus error signal and a tracking error signal are detected and the position of the objective lens is controlled according to surface displacement, eccentricity, and the like of the optical disc.

A differential push-pull (DPP) method is known as a typical method for detecting a tracking error signal. In the DPP method, a light beam is separated into three beams: a main beam; a $+1^{st}$ order diffracted beam; and a $-1^{st}$ order diffracted beam. These three beams are respectively converged on three adjacent guide grooves formed at a prescribed pitch on the optical disc. Push-pull signals respectively obtained by detecting reflected light of the three beams and performing an arithmetic operation have a phase difference of 180 degrees between the main beam and the $+1^{st}$ and $-1^{st}$ order diffracted beams. Therefore, by performing arithmetic processing of each push-pull signal, only offset components included in the push-pull signals are selectively cancelled each other, whereby an excellent tracking error signal can be detected. Accordingly, the DDP method has been widely used especially in a DVD recording optical pickup (e.g., see Patent document 1).

There are various standards for currently used optical discs, and a guide groove pitch varies depending on the standards of the optical discs. For example, optical discs such as a write once type DVD-R (Recordable) and an erasable type DVD-RW (Disk ReWritable) have a guide groove pitch of 0.74 μm, and optical discs such as an erasable type DVD-RAM (Random Access Memory) has a guide groove pitch of 1.23 μm. An optical pickup device that enables recording and playback of two or more types of optical discs of different standards has been demanded. The following optical pickup device is proposed in view of this demand (e.g., see Patent document 2).

In the optical pickup device disclosed in Patent document 2, a special diffraction grating for separating a light beam is divided into three regions, and the phase of grating grooves periodically provided in each region is sequentially shifted by 90 degrees. A tracking error detection method using such a special diffraction grating is called an in-line DPP method, and the in-line DPP method enables stable tracking error detection on a plurality of optical information recording media having different guide groove pitches.

Patent document 1: Japanese Patent Publication for Opposition No. 4-34212

Patent document 2: Japanese Laid-Open Patent Publication No. 2004-145915

DISCLOSURE OF THE INVENTION

Problems to be Solved by the Invention

However, a conventional optical pickup device using the conventional in-line DPP method has the following problems.

FIG. 18 shows convergence spots of light beams that are converged on an optical information recording medium by a conventional optical pickup device. A convergence spot 101 corresponding to a $+1^{st}$ order diffracted beam has higher intensity on the right side in a radial direction X of the optical information recording medium and has lower intensity on the left side. On the other hand, a convergence spot 102 corresponding to a $-1^{st}$ order diffracted beam has lower intensity on the right side and has higher intensity on the left side. This can be explained as follows:

As shown in FIG. 19, in a special diffraction grating used in the conventional in-line DPP method, the phase of grating grooves 119a in a region 119 is ahead of that of grating grooves 120a in a central region 120 by 90 degrees, and the phase of grating grooves 121a in a region 121 is behind that of the grating grooves 120a in the central region 120 by 90 degrees. Accordingly, the phase of the $+1^{st}$ order diffracted beam that has passed through the region 119 is ahead of that of the $+1^{st}$ order diffracted beam that has passed through the central region 120 by 90 degrees, and the phase of the $+1^{st}$ order diffracted beam that has passed through the region 121 is behind that of the $+1^{st}$ order diffracted beam that has passed through the central region 120 by 90 degrees. The phase relation of the grating grooves and diffracted beams is opposite for the $-1^{st}$ order diffracted beam. In other words, the phase of the $-1^{st}$ order diffracted beam that has passed through the region 119 is behind that of the $-1^{st}$ order diffracted beam that has passed through the central region 120 by 90 degrees, and the phase of the –1st order diffracted beam that has passed through the region 121 is ahead of that of the $-1^{st}$ order diffracted beam that has passed through the central region 120 by 90 degrees.

Accordingly, the $+1^{st}$ order diffracted beam has larger intensity distribution on the region 121 side where the phase is retarded, and the convergence spot 101 corresponding to the $+1^{st}$ order diffracted beam on the optical information recording medium has higher intensity on the right side and lower intensity on the left side. On the other hand, the $-1^{st}$ order diffracted beam has larger intensity distribution on the region 119 side where the phase is retarded, and the convergence spot 102 corresponding to the $-1^{st}$ order diffracted beam has lower light intensity on the right side and higher intensity on the left side.

FIG. 20 shows signal waveforms of a DPP signal obtained by the above convergence spots. In FIG. 20, the ordinate indicates signal strength and the abscissa indicates a relative position of the convergence spot on the optical information recording medium. MPP is a push-pull signal of a main beam corresponding to a $0^{th}$ order diffracted beam, SPP1 is a push-pull signal of a preceding sub-beam corresponding to a $+1^{st}$ order diffracted beam, SPP2 is a push-pull signal of a succeeding sub-beam corresponding to a $-1^{st}$ order diffracted beam, and DPP is a tracking error signal (differential push-pull signal) obtained from MPP, SPP1, and SPP2 as shown by the formula (1):

$$DPP = MPP - k \times (SPP1 + SPP2) \qquad (1)$$

where k is an arbitrary amplification factor. Since the respective convergence spots corresponding to the $+1^{st}$ order diffracted beam and the $-1^{st}$ order diffracted beam have left-right asymmetric intensity distribution, the phase difference of SSP1 and SSP2 from MPP is shifted from 180 degrees. If there is a signal strength difference between SPP1 and SPP2, DPP is shifted from a proper value and therefore each convergence spot cannot be formed on the same guide groove, hindering stable tracking error signal detection by the in-line DPP method. Note that, the positions where SPP1, SPP2, and DPP have proper values are shown by chain line in FIG. 20.

The invention is made to solve the above conventional problems and it is an object of the invention to implement an optical pickup device for conducting stable tracking error detection on a plurality of optical information recording media having different guide groove pitches while maintaining the advantages of the in-line DPP method.

Means for Solving the Problems

In order to achieve the above object, an optical pickup device of the invention includes a diffraction grating that is divided into four regions having different phases from each other.

More specifically, an optical pickup device according to the invention is an optical pickup device for recording information onto an optical information recording medium and reading and erasing information recorded on the optical information recording medium. The optical pickup device includes: a light source; a diffraction grating for separating a light beam emitted from the light source into at least three light beams; and a photodetector for receiving the separated light beams reflected from the optical information recording medium. The diffraction grating is divided into a first region, a second region, a third region, and a fourth region having periodic structures of different phases by dividing lines extending in a direction parallel to a tangential direction of tracks of the optical information recording medium. The second region and the third region are located between the first region and the fourth region sequentially from the first region side. The periodic structure of the second region has a phase difference of approximately 180 degrees from the periodic structure of the third region, and the periodic structure of the first region has a phase difference of approximately 180 degrees from the periodic structure of the fourth region.

The optical pickup device of the invention includes such a diffraction grating that the periodic structure of the second region has a phase difference of approximately 180 degrees from the periodic structure of the third region and the periodic structure of the first region has a phase difference of approximately 180 degrees from the periodic structure of the fourth region. Therefore, the phase of a $+1^{st}$ order diffracted beam that has passed through the first region is advanced with respect to that of the $+1^{st}$ order diffracted beam that has passed through the second region. The phase of the $+1^{st}$ order diffracted beam that has passed through the fourth region is advanced with respect to that of the $+1^{st}$ order diffracted beam that has passed through the third region. The phase of the $-1^{st}$ order diffracted beam, on the other hand, is retarded in both cases. Accordingly, unlike the conventional in-line DPP method, spot shapes do not become left-right asymmetric, but the intensity distribution of convergence spots becomes left-right asymmetric with respect to an extending direction of guide grooves. An optical pickup device for conducting stable tracking error detection on a plurality of optical information recording media having different guide groove pitches can thus be implemented.

In the optical pickup device of the invention, a distance between the dividing line dividing the first region and the second region from each other and the dividing line dividing the second region and the third region from each other is preferably equal to a distance between the dividing line dividing the second region and the third region from each other and the dividing line dividing the third region and the fourth region from each other.

In the optical pickup device of the invention, the light beams preferably include a $0^{th}$ order diffracted beam, a $+1^{st}$ order diffracted beam, and a $-1^{st}$ order diffracted beam.

In the optical pickup device of the invention, it is preferable that a plurality of guide grooves are periodically formed on a recording surface of the optical information recording medium, and each of the light beams is converged on one of the plurality of guide grooves.

Preferably, the optical pickup device of the invention further includes an arithmetic processing circuit for detecting a tracking error signal by a differential push-pull method based on an output signal of the photodetector.

In the optical pickup device of the invention, it is preferable that the photodetector includes at least three light receiving elements respectively corresponding to the reflected light beams, and each of the light receiving elements is divided into a plurality of light receiving regions.

In the optical pickup device of the invention, a center of the light beam emitted from the light source is preferably positioned in the second region or the third region.

In the optical pickup device of the invention, it is preferable that the light source includes a first light source and a second light source, and a straight line connecting a center of a light beam emitted from the first light source and a center of a light beam emitted from the second light source crosses at least one of the dividing line dividing the first region and the second region from each other, the dividing line dividing the second region and the third region from each other, and the dividing line dividing the third region and the fourth region from each other.

In the optical pickup device of the invention, it is preferable that the light source includes a first light source and a second light source, and a straight line connecting a center of a light beam emitted from the first light source and a center of a light beam emitted from the second light source crosses the dividing line dividing the second region and the third region from each other.

In the optical pickup device of the invention, it is preferable that the light source includes a plurality of light sources, and a center of at least one of light beams respectively emitted from the plurality of light sources is positioned in the second region or the third region.

In the optical pickup device of the invention, the periodic structure of the first region of the diffraction grating preferably has a phase difference of 10 degrees to 350 degrees from the periodic structure of the second region. More preferably, the periodic structure of the first region of the diffraction grating has a phase difference of approximately 90 degrees from the periodic structure of the second region.

Preferably, the optical pickup device of the invention further includes an objective lens for converging the at least three light beams onto a recording surface of the optical information recording medium as independent convergence spots, and a region of the diffraction grating on which a range of the emitted light beam corresponding to an effective beam diameter determined by an aperture diameter of the objective lens is incident is a region including the first region, the second region, the third region, and the fourth region.

In this case, a sum of a width of the second region and a width of the third region is preferably in a range of 10% to 40% of the effective beam diameter.

EFFECTS OF THE INVENTION

The invention can thus implement an optical pickup device for conducting stable tracking error detection on a plurality of optical information recording media having different guide groove pitches while maintaining the advantages of the in-line DPP method.

Figure 1:
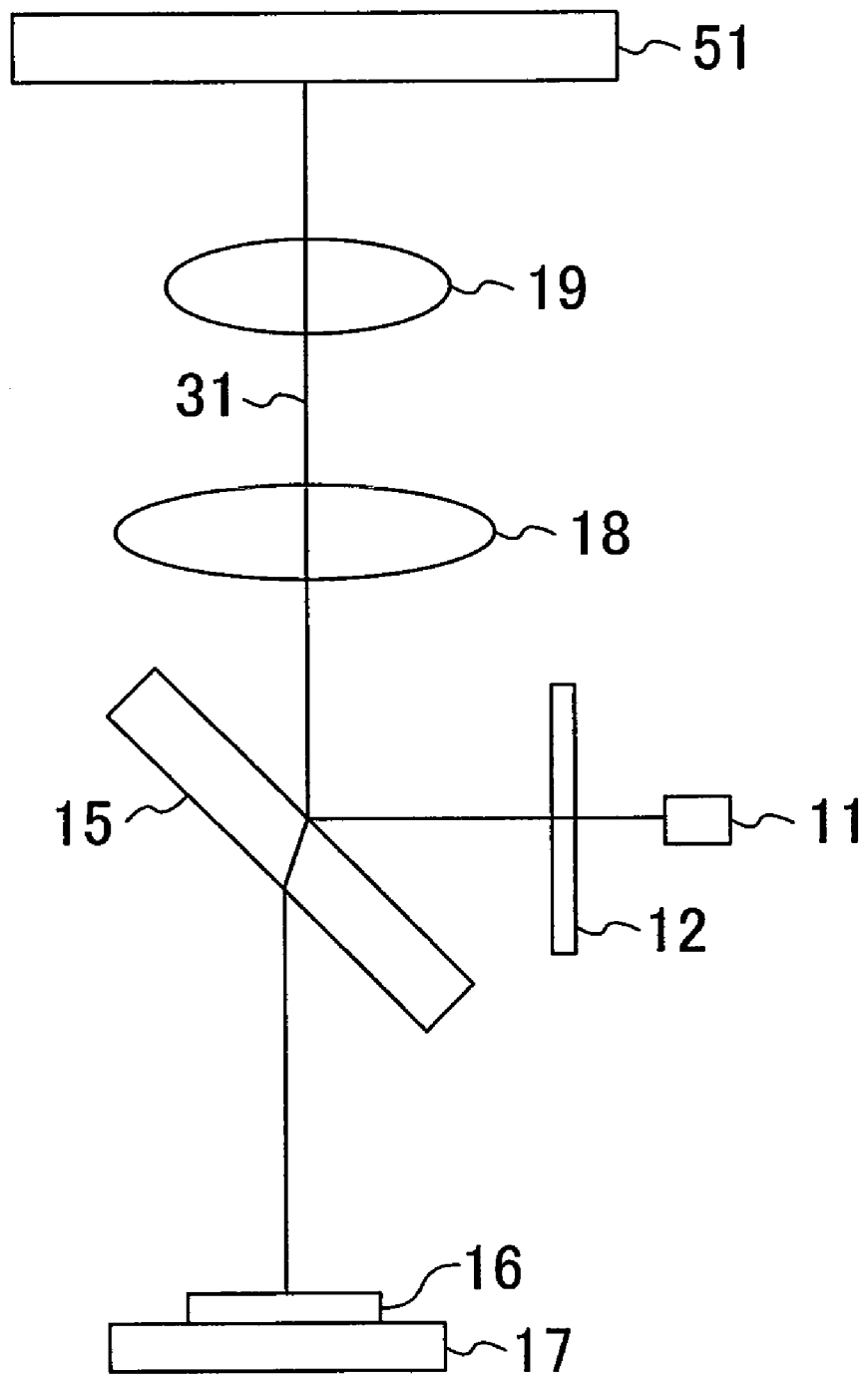
FIG. 1 is a block diagram of an optical pickup device according to an embodiment of the invention.

DESCRIPTION OF THE REFERENCE NUMERALS 11 light source
12 diffraction grating
12A first region
12B second region
12C third region
12D fourth region
12$a$ grating groove
12$b$ grating groove
12$c$ grating groove
12$d$ grating groove
15 half mirror
16 photodetector
17 integrated circuit board
18 collimating lens
19 objective lens
21A light receiving element
21B light receiving element
21C light receiving element
23 arithmetic processing circuit
24 subtracter
25 subtracter
26 subtracter
27 adder
28 amplifier
29 subtracter
31 light beam
31$a$ main beam

BEST MODE FOR CARRYING OUT THE INVENTION

An embodiment of the invention will be described with reference to the accompanying drawings. FIG. 1 schematically shows a structure of an optical pickup device according to an embodiment of the invention.

As shown in FIG. 1, the optical pickup device of the embodiment includes a light source 11, such as a semiconductor laser element, for emitting a light beam 31 for performing recording of information onto an optical information recording medium 51 and playback of information recorded on the optical information recording medium 51, a diffraction grating 12 for diffracting and separating the light beam 31 into at least three light beams (not shown): a main beam that is a $0^{th}$ order diffracted beam; a sub-beam that is a $+1^{st}$ order diffracted beam; and a sub-beam that is a $-1^{st}$ order diffracted beam, a half mirror 15 for guiding the separated light beams 31 to the optical information recording medium 51, and an integrated circuit board 17 having a photodetector 16 for receiving the light beams 31 reflected from the optical information recording medium 51.

A collimating lens 18 and an objective lens 19 are placed between the half mirror 15 and the optical information recording medium 51. The light beam 31 emitted from the light source 11 is first diffracted and separated by the diffraction grating 12 into at least three light beams: a $0^{th}$ order diffracted beam; a $+1^{st}$ order diffracted beam; and a $-1^{st}$ order diffracted beam. These beams are then reflected by the half mirror 15 and reach the objective lens 19 through the collimating lens 18. The $0^{th}$ order diffracted beam, the $+1^{st}$ order diffracted beam, and the $-1^{st}$ order diffracted beam thus obtained by the diffraction grating 1 are then independently converged on a recording surface of the optical information recording medium 51 by the objective lens 19 to form three convergence spots.

Figure 2:
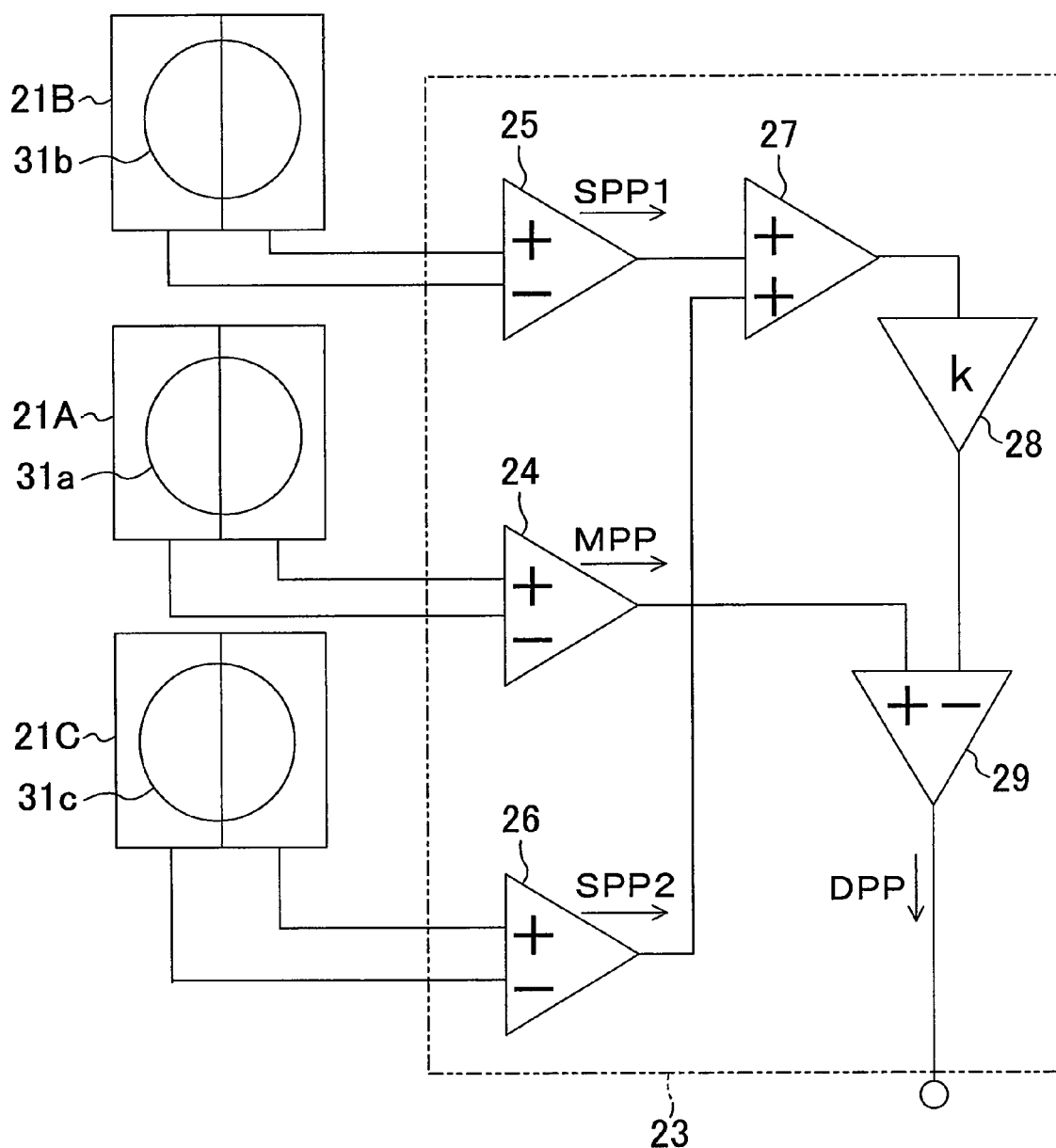
FIG. 2 is a circuit diagram of a photodetector of the optical pickup device according to the embodiment of the invention.

FIG. 2 shows a circuit structure of the integrated circuit board 17 having the photodetector 16 in the optical pickup device of FIG. 1. As shown in FIG. 2, the integrated circuit board 17 has light receiving elements 21A, 21B, and 21C and an arithmetic processing circuit 23 for performing an arithmetic operation of signals from the light receiving elements. A main beam 31a and two sub-beams 31b and 31c separated from the emitted light beam 31 by the diffraction grating 12 are received by the light receiving elements 21A, 21B, and 21C, respectively. Each of the light receiving elements 21A, 21B, and 21C is divided into a plurality of light receiving regions.

Signals detected by the light receiving elements 21A, 21B, and 21C are applied to the arithmetic processing circuit 23. The arithmetic processing circuit 23 has subtracters 24, 25, and 26 for receiving signals from the light receiving elements 21A, 21B, and 21C, respectively, and an adder 27, an amplifier 28, and a subtracter 29 for receiving outputs from the subtracters 24, 25, and 26. The subtracters 24, 25, and 26 receive signals from the light receiving elements 21A, 21B, and 21C and output push-pull signals MPP, SPP1, and SPP2, respectively. The adder 27, the amplifier 28, and the subtracter 29 of the arithmetic processing circuit 23 will be described later.

In the circuit structure of FIG. 2, each light receiving element is divided into two light receiving regions. However, each light receiving element may be divided into three or more light receiving regions. In FIG. 2, each beam on each light receiving element is schematically shown to have a circular shape. However, the beam shape is not limited to this. When an astigmatic method is used for a focus error signal, each beam on each light receiving element is rotated by approximately 90 degrees. Each light receiving element therefore needs to be rotated by 90 degrees in advance in this case.

Figure 3:
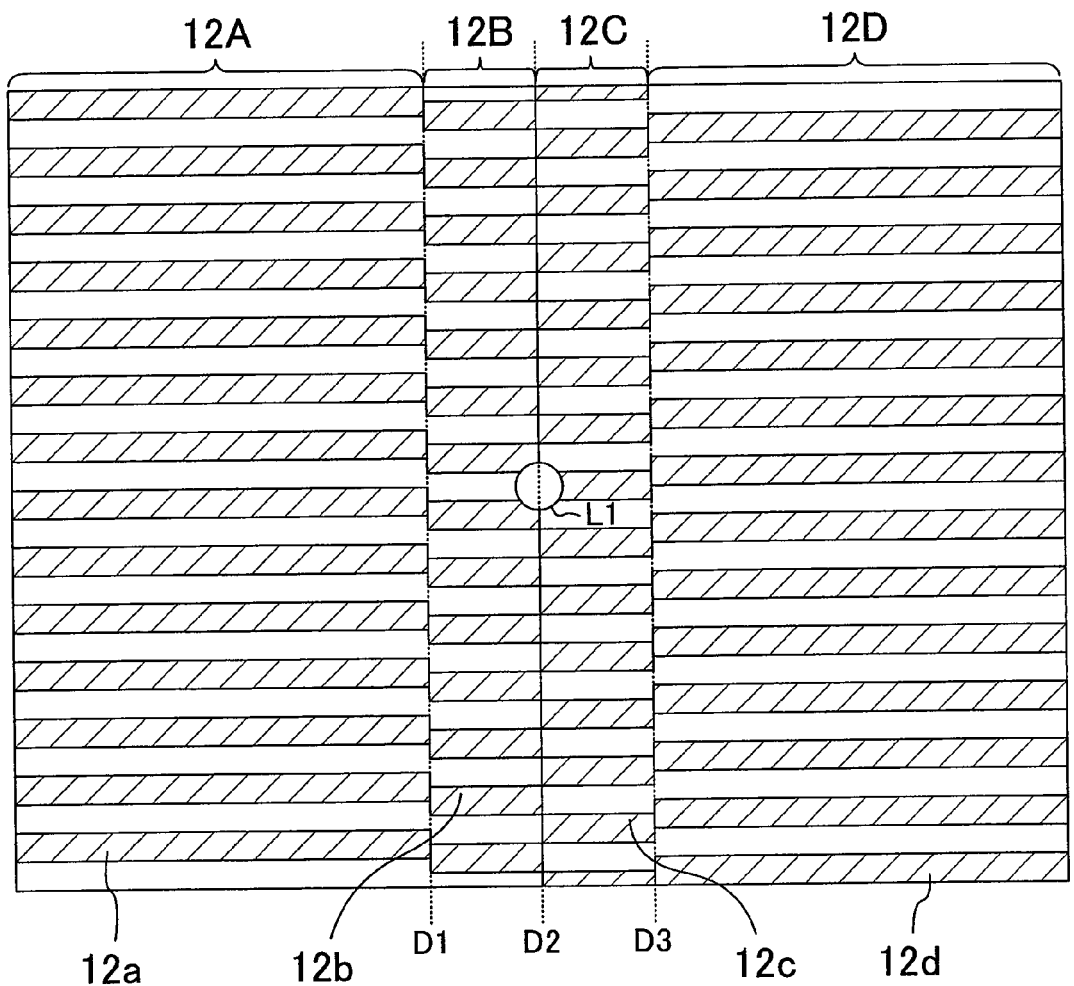
FIG. 3 is a plan view of a diffraction grating of the optical pickup device according to the embodiment of the invention.

The optical pickup device of this embodiment is characterized in the diffraction grating 12 for diffracting the light beam 31 emitted from the light source 11, and is characterized especially in a periodic structure of the diffraction grating 12. FIG. 3 shows a periodic structure, that is, a grating pattern, of the diffraction grating 12.

As shown in FIG. 3, a grating surface of the diffraction grating 12 is divided into four regions: a first region 12A; a second region 12B; a third region 12C; and a fourth region 12D by three dividing lines D1, D2, and D3 extending in an extending direction of guide grooves of the optical information recording medium 51 (hereinafter, referred to as Y direction), that is, in a direction substantially parallel to a tangential direction of tracks of the optical information recording medium 51. Note that, in this case, the parallel direction means a parallel direction in view of an optical system provided between the diffraction grating 12 and the optical information recording medium 51. The first region 12A and the second region 12B are adjacent to each other with the dividing line D1 interposed therebetween. The second region 12B and the third region 12C are adjacent to each other with the dividing line D2 interposed therebetween. The third region 12C and the fourth region 12D are adjacent to each other with the dividing line D3 interposed therebetween.

As shown in FIG. 3, the first region 12A, the second region 12B, the third region 12C, and the fourth region 12D have grating grooves 12a, 12b, c, and 12d periodically provided along a radial direction of the optical information recording medium 51 (hereinafter, referred to as X direction), respectively. Note that, in this embodiment, the grating grooves 12a, 12b, 12c, and 12d have the same width, and the portions (protruding portions) between the grating grooves 12a, 12b, 12c, and 12d have the same width.

The phase of the periodic structure formed by the grating grooves 12a in the first region 12A is substantially 90 degrees ahead of that of the periodic structure formed in the second region 12B (a phase difference of substantially +90 degrees). In other words, the arrangement cycle of the grating grooves 12a in the first region 12A is shifted by quarter cycle from the arrangement cycle of the grating grooves 12b in the second region 12B in +Y direction. The phase of the periodic structure formed in the fourth region 12D is substantially 90 degrees behind that of the periodic structure formed in the second region 12B (a phase difference of substantially -90 degrees). In other words, the arrangement cycle of the grating grooves 12d in the fourth region 12D is shifted by quarter cycle from the arrangement cycle of the grating grooves 12b in the second region 12B in -Y direction. Accordingly, the periodic structure in the first region 12A has a phase difference of substantially 180 degrees from the periodic structure in the fourth region 12D. The phase of the periodic structure in the third region 12C is shifted by substantially 180 degrees from that of the periodic structure in the second region 12B. In other words, the arrangement cycle of the grating grooves 12c in the third region 12C is shifted by half cycle from the arrangement cycle of the grating grooves 12b in the second region 12B in +Y direction.

Note that the phase difference of the periodic structure between the regions does not have to be exactly 90 degrees or 180 degrees. Since the convergence spots on the recording surface of the optical information recording medium 51 need only have a shape described below, the phase difference between regions may include an error of about ±10 degrees.

In this embodiment, as shown in FIG. 3, the center (the center of a light emitting point) L1 of the light beam emitted from the light source 11 is positioned on the dividing line D2 within the assembly accuracy range of the device.

The emitted light beam incident on the diffraction grating 12 is separated into a main beam and sub-beams having a prescribed phase difference by the respective periodic structures formed in the first region 12A, the second region 12B, the third region 12C, and the fourth region 12D. The main beam and the sub-beams are then guided to the optical information recording medium 51.

Hereinafter, the reason why the optical pickup device of this embodiment can stably detect tracking errors on optical information recording media having different guide groove pitches will be described.

Figure 4:
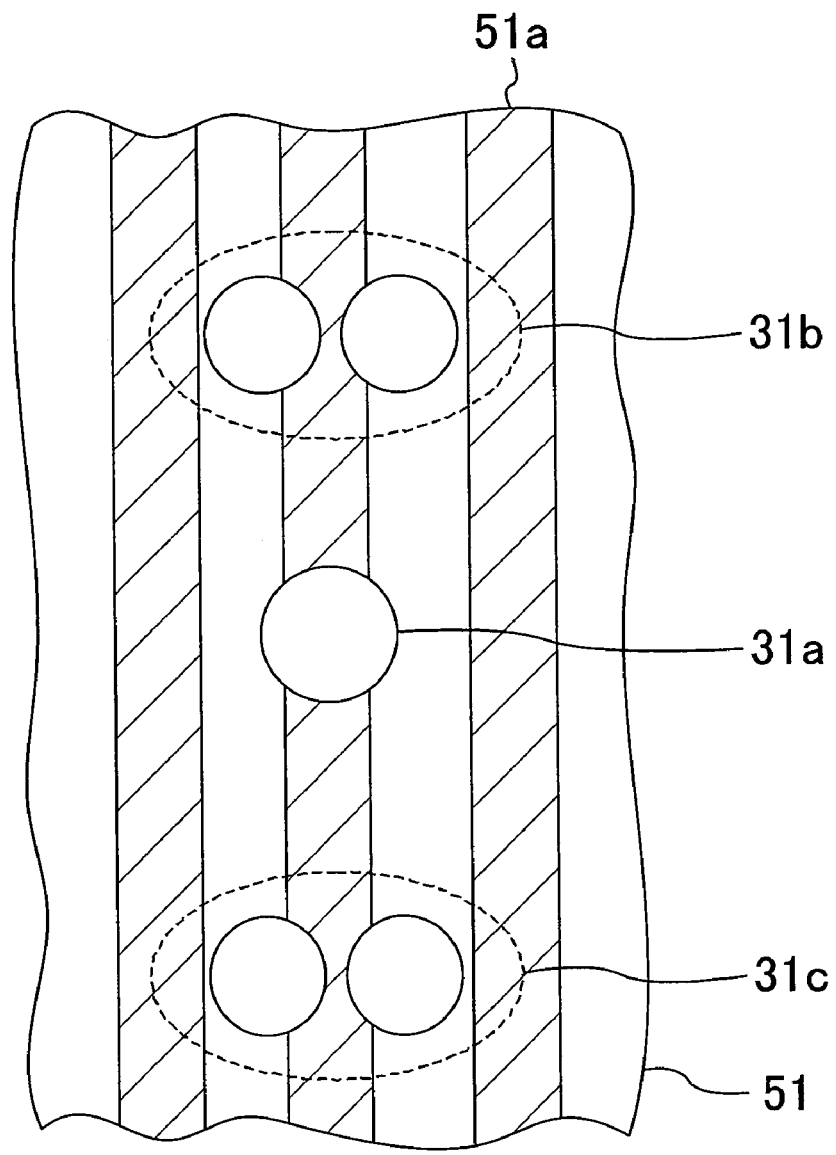
FIG. 4 is a plan view showing the shapes of convergence spots formed on a recording surface of an optical information recording medium by the optical pickup device according to the embodiment of the invention.

FIG. 4 shows the shapes of respective convergence spots of the main beam 31a and two sub-beams 31b and 31c of the emitted light beam which are generated by the diffraction grating 12 on the recording surface of the optical information recording medium 51. In FIG. 4, X direction shows the radius direction of the optical information recording medium and Y direction shows the extending direction of the guide grooves.

In the diffraction grating 12, the diffraction grating in the second region 12B has a phase difference of 180 degrees from the diffraction grating in the third region 12C. Therefore, diffracted light that has passed through the second region 12B and diffracted light that has passed through the third region 12C cancel each other, and the respective convergence spots of the sub-beams 31b and 31c on the recording surface of the optical information recording medium 51 in FIG. 4 have lower intensity in the center. Since the respective convergence spots of the sub-beams 31b and 31c need only have lower intensity in the center, the phase difference between the second region 12B and the third region 12C may include an error of about ±10 degrees from 180 degrees.

The phase of the diffraction grating in the first region 12A is 90 degrees ahead of that of the diffraction grating in the second region 12B. The phase of the diffraction grating in the fourth region 12D is 90 degrees ahead of that of the diffraction grating in the third region 12C. Accordingly, the phase of the +1$^{st}$ order diffracted beam that has passed through the first region 12A is advanced by 90 degrees from that of the +1$^{st}$ order diffracted beam that has passed through the second region 12B. The phase of the +1$^{st}$ order diffracted beam that has passed through the fourth region 12D is advanced by 90 degrees from that of the +1$^{st}$ order diffracted beam that has passed through the third region 12C. The phase of the −1$^{st}$ order diffracted beam, on the other hand, is retarded by 90 degrees. Accordingly, unlike the conventional in-line DPP method, spot shapes do not become left-right asymmetric, but the intensity distribution of the convergence spots becomes left-right asymmetric with respect to Y direction. In this case as well, the phase difference between the first region 12A and the second region 12B and the phase difference between the fourth region 12D and the third region 12C may include an error of about ±10 degrees from 90 degrees.

As shown in FIG. 4, a plurality of guide grooves 51a are periodically formed on the recording surface of the optical information recording medium 51. The respective convergence spots of the main beam 31a, the sub-beam 31b, and the sub-beam 31c of the light beam 31 converged by the objective lens 19 are located on the same guide groove 51a, as shown in FIG. 4.

The main beam 31a, the sub beam 31b, and the sub beam 31c are reflected at the respective convergence spots, and the reflected light beams corresponding to the respective convergence spots are respectively received by the light receiving elements 21A, 21B, and 21C of the photodetector 16. The light receiving elements 21A, 21B, and 21C output a push-pull signal MPP corresponding to the main beam 31a, a push-pull signal SPP1 corresponding to the sub-beam 31b, and a push-pull signal SPP2 corresponding to the sub-beam 31c, respectively.

Offset components of the push-pull signals MPP, SPP1, and SPP2 resulting from a radial shift of the objective lens 19 (a shift in the radius direction of the optical information recording medium) and a tilt of the optical information recording medium 51 are generated on the same side (the same phase) for each of the radial shift of the objective lens 19 and the tilt of the optical information recording medium 51. Accordingly, a differential push-pull (DPP) signal obtained by cancelling the offsets resulting from the radial shift of the objective lens 19 and the tilt of the optical information recording medium 51 can be detected by performing an arithmetic operation shown by the formula (2) by using the adder 27, the amplifier 28, and the subtracter 29 shown in FIG. 2:

$$DPP=MPP-k\times(SPP1+SPP2) \quad (2)$$

where k is an amplification factor of the amplifier 28.

Figure 5:
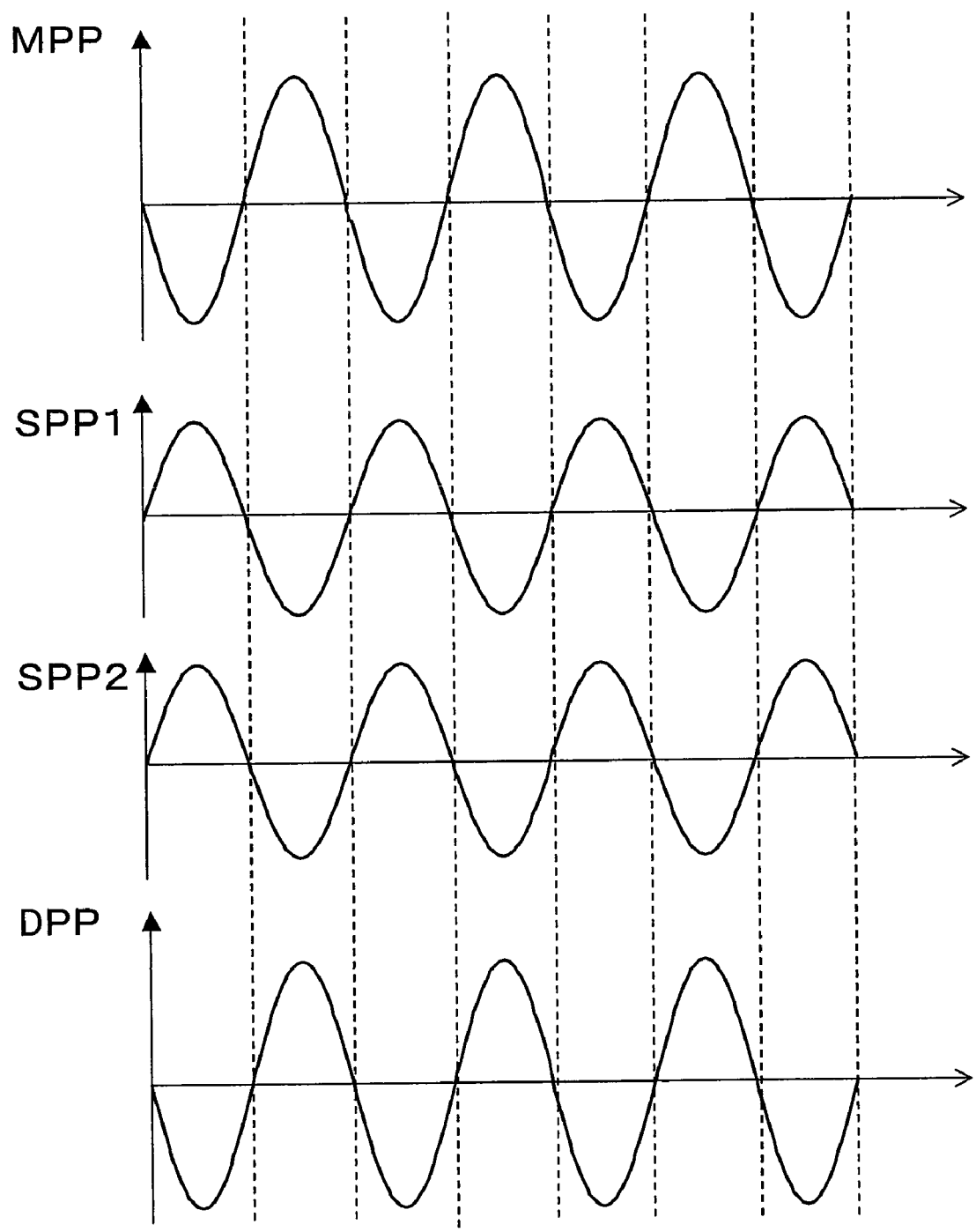
FIG. 5 is a graph showing signal waveforms obtained by the optical pickup device according to the embodiment of the invention.

FIG. 5 shows respective output waveforms of the push-pull signals MPP, SPP1, and SPP2 and the DPP signal obtained by the formula (2). In FIG. 5, the ordinate indicates signal strength and the abscissa indicates a relative position of the convergence spot on the optical information recording medium 51. As shown in FIG. 5, SPP1 and SPP2 have a phase difference of exactly 180 degrees from MPP. Even if there is a signal strength difference between SPP1 and SPP2, the DPP signal obtained by the formula (2) has a proper value and each convergence spot can therefore be formed on the same guide groove.

As shown in FIG. 2, the inputs of the adder 27 are respectively connected to the respective outputs of the subtracters 25 and 26, and the input of the amplifier 28 is connected to the output of the adder 27. The inputs of the subtracter 29 are respectively connected to the output of the subtracter 24 and the output of the amplifier 28. The arithmetic operation shown by the formula (2) can be performed with this structure. The coefficient k in the formula (2) is used to correct the difference in light intensity among the main beam 31a, the sub-beam 31b, and the sub-beam 31c that are reflected from the optical information recording medium 51. When the light intensity ratio of the main beam 31a, the sub-beam 31c, and the sub-beam 31c is a:b:b, the coefficient k is a/2b. In other words, the coefficient k is a constant that is determined according to the type of the optical information recording medium 51. Note that a signal processing circuit having a conventional structure may be used in this embodiment.

The optical information recording medium 51 is not limited to a specific type, and DVDs including a DVD-ROM, a DVD-RAM, a DVD-R, and a DVD-RW and CDs including a CD-ROM, a CD-R, and a CD-RW may be used as the optical information recording medium 51. The wavelength of the light beam 31 can be determined according to the type of the optical information recording medium 51, and is in the range of about 650 nm to about 780 nm in the case of a DVD and a CD. As for DVDs, stable tracking error signal detection can be performed on both a DVD having a guide groove pitch of 0.74 μm such as a DVD-R and a DVD having a guide groove pitch of 1.23 μm such as a DVD-RAM.

In this embodiment, the diffraction grating 12 is placed between the light source 11 and the half mirror 15 in the optical system shown in FIG. 1. However, the diffraction grating 12 may alternatively be placed, for example, between the half mirror 15 and the collimating lens 18. The optical system of FIG. 1 may be replaced with an optical system in which a light source and a photodetector are integrated (for example, an optical system that does not use a half mirror), and the diffraction grating may be placed between the light source and the collimating lens.

In this embodiment, the grating grooves in each region of the diffraction grating 12 are formed along X direction, that is, the radius direction of the optical information recording medium. However, the grating grooves may alternatively be formed in a direction oblique to X direction. In this embodiment, the second region 12B and the third region 12C of the diffraction grating 12 have the same width. However, the second region 12B and the third region 12C of the diffraction grating 12 need not necessarily have the same width.

In this embodiment, a single light beam is emitted from the light source. However, the same effects can be obtained even when an optical pickup device has a plurality of light sources and a plurality of light beams are emitted from the light sources.

Figure 6:
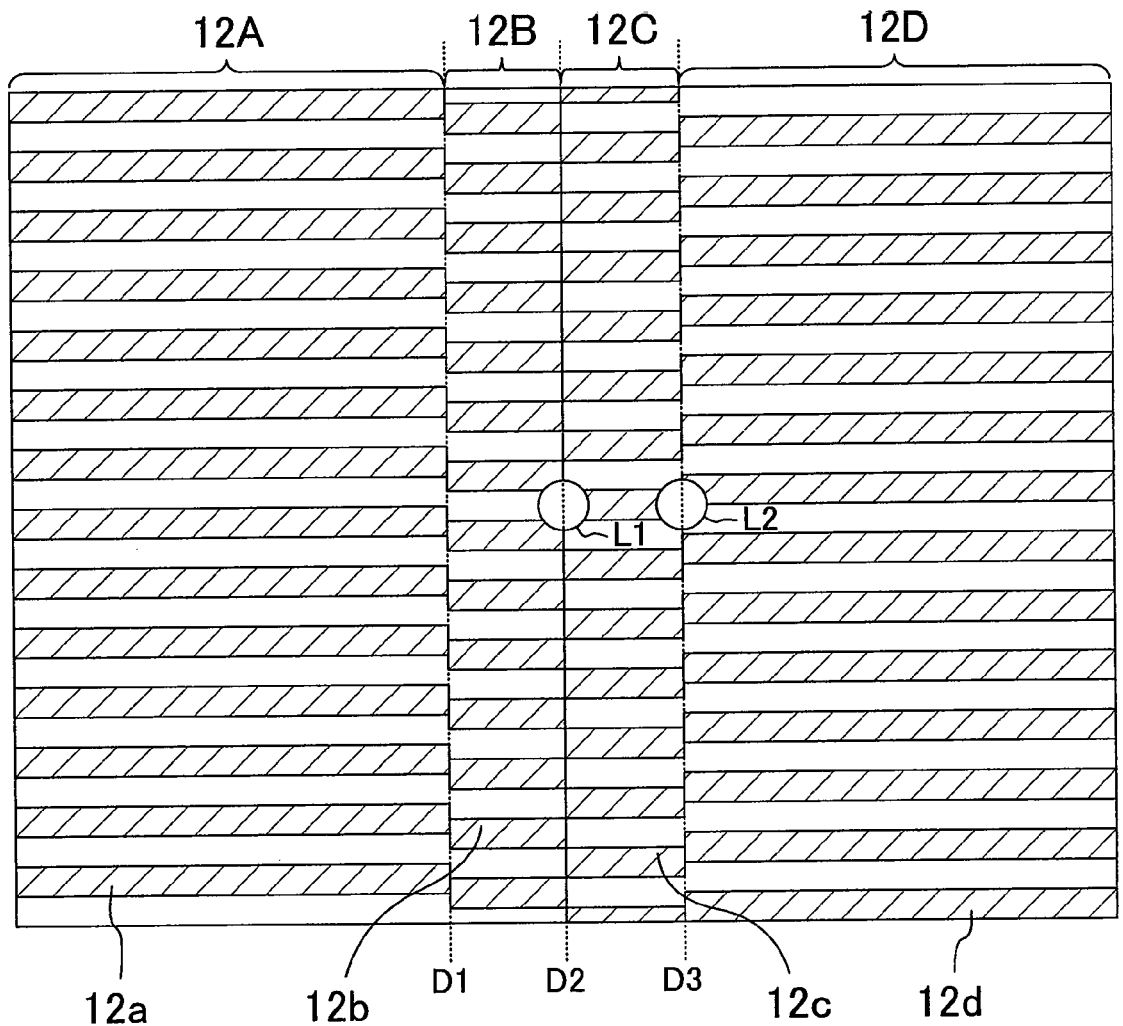
FIG. 6 is a plan view showing an example of a positional relation between the diffraction grating of the optical pickup device according to the embodiment of the invention and the respective centers of light beams.
Figure 7:
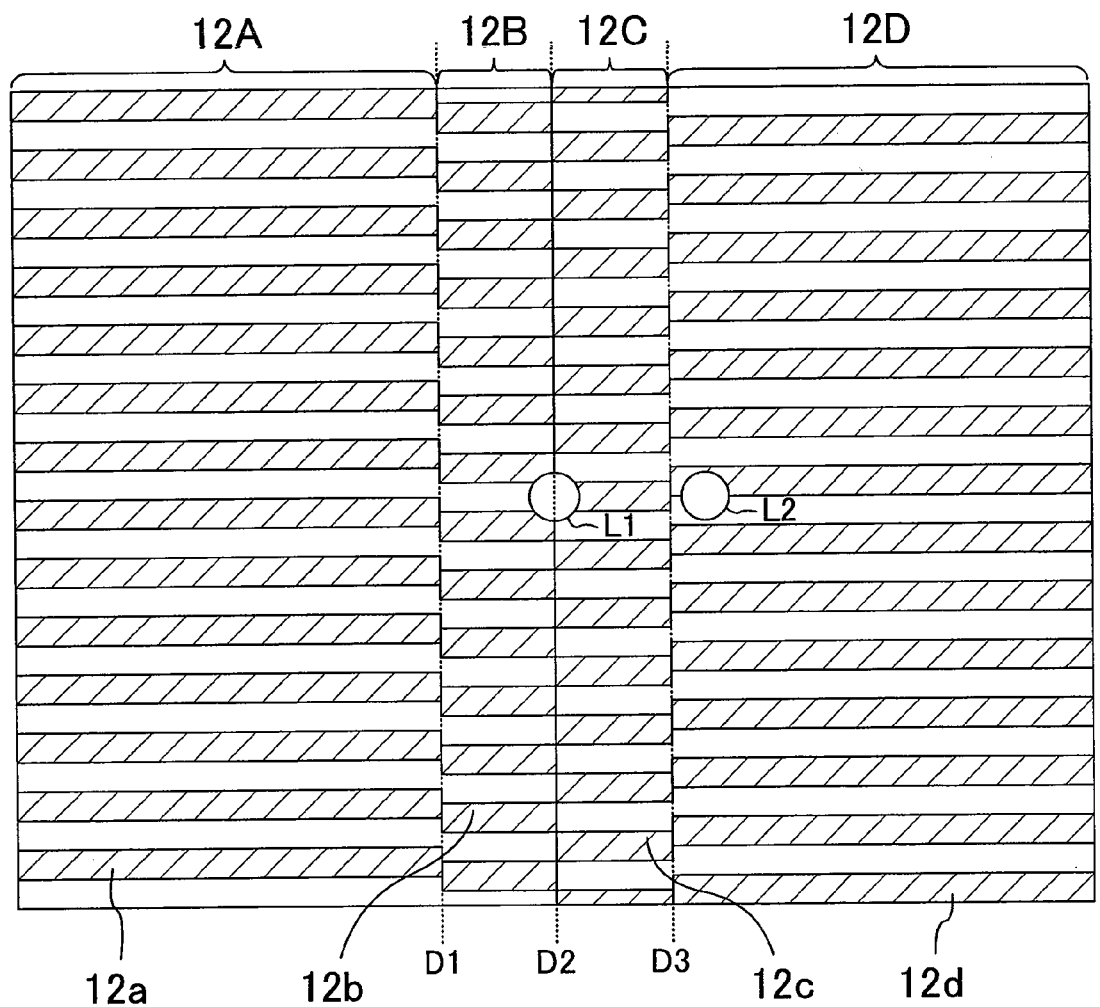
FIG. 7 is a plan view showing an example of a positional relation between the diffraction grating of the optical pickup device according to the embodiment of the invention and the respective centers of light beams.
Figure 8:
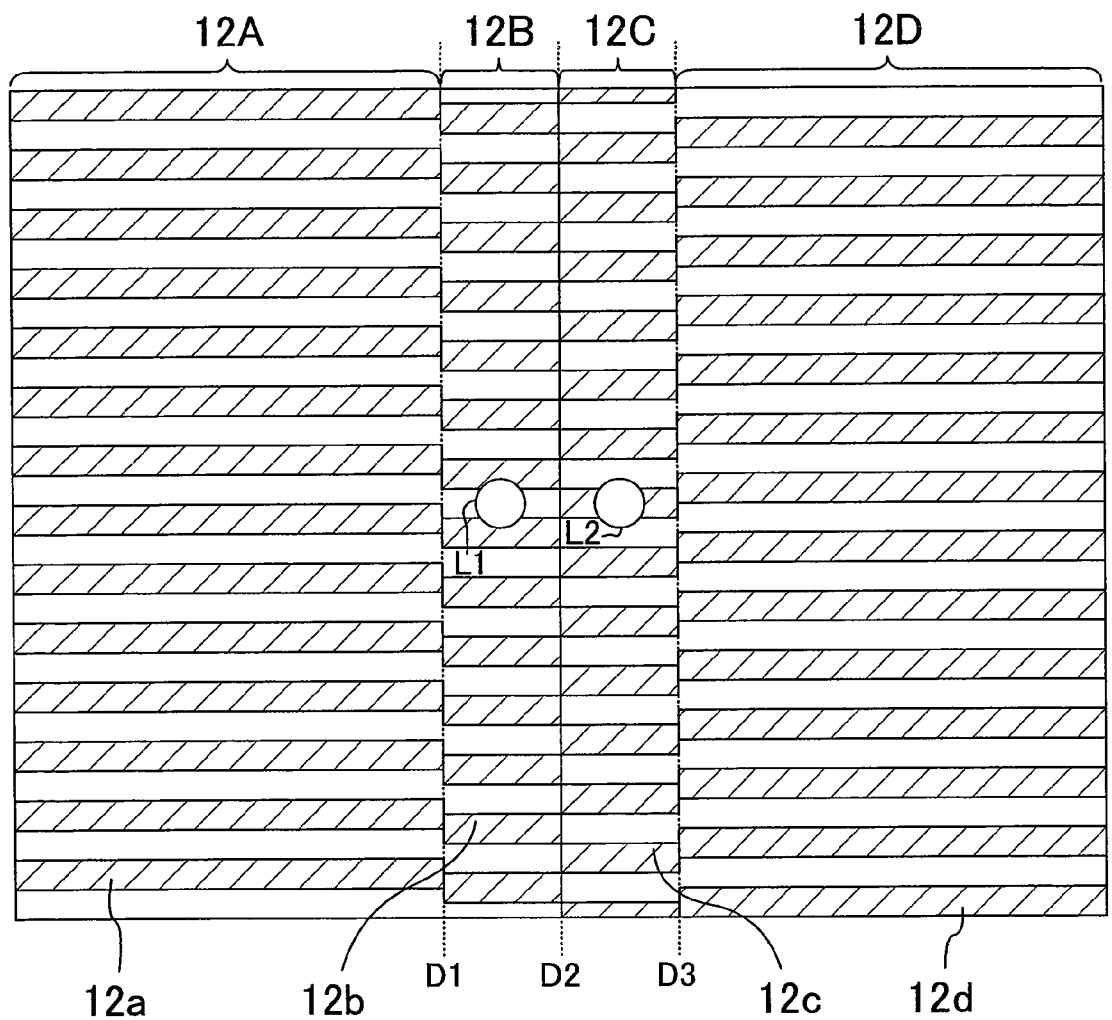
FIG. 8 is a plan view showing an example of a positional relation between the diffraction grating of the optical pickup device according to the embodiment of the invention and the respective centers of light beams.
Figure 9:
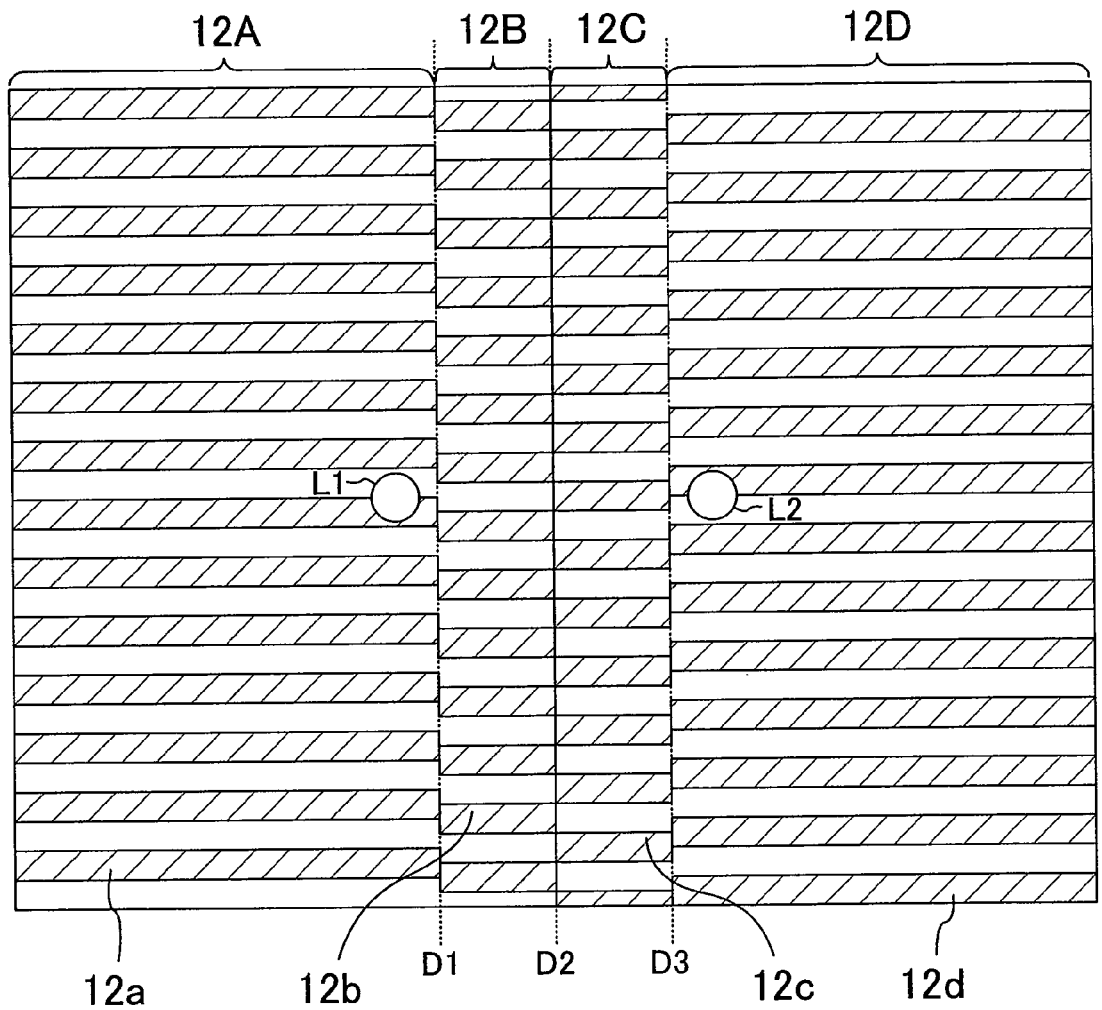
FIG. 9 is a plan view showing an example of a positional relation between the diffraction grating of the optical pickup device according to the embodiment of the invention and the respective centers of light beams.
Figure 9:
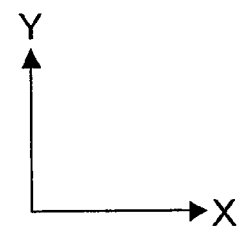

For example, as shown in FIG. 6, the center L1 of a light emitting point of a first light source may be positioned on the dividing line D2 and the center L2 of a light emitting point of a second light source may be positioned on the dividing line D3 within the assembly accuracy range of the device. Alternatively, as shown in FIG. 7, the center L1 of a light emitting point of a first light source may be positioned on the dividing line D2 and the center L2 of a light emitting point of a second light source may be positioned within the fourth region 12D near the dividing line D3 within the assembly accuracy range of the device. Alternatively, as shown in FIG. 8, the center L1 of a light emitting point of a first light source may be positioned within the second region 12B and the center L2 of a light emitting point of a second light source may be positioned within the third region 12C within the assembly accuracy range of the device. Alternatively, as shown in FIG. 9, the center L1 of a light emitting point of a first light source may be positioned within the first region 12A near the dividing line D1 and the center L2 of a light emitting point of a second light source may be positioned within the fourth region 12D near the dividing line D3 within the assembly accuracy range of the device.

Figure 10:
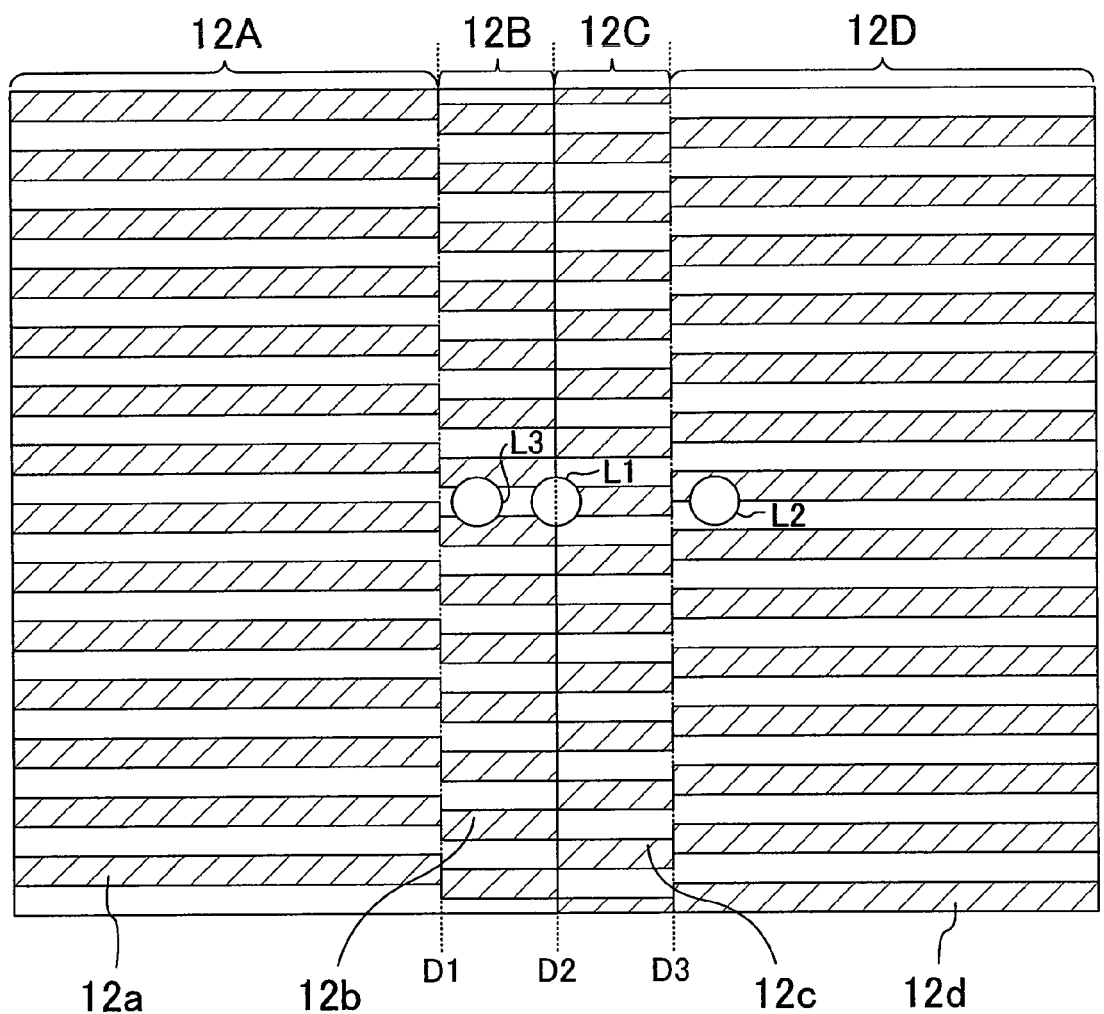
FIG. 10 is a plan view showing an example of a positional relation between the diffraction grating of the optical pickup device according to the embodiment of the invention and the respective centers of light beams.

The number of light sources is not limited to two, and three or more light sources may be provided. For example, in the case where three light sources are provided, as shown in FIG. 10, the center of a light emitting point of at least one light source is positioned within the second region 12B or the third region 12C within the assembly accuracy range of the device and the center of a light emitting point of the remainder of the light sources need not be specifically limited.

Figure 11:
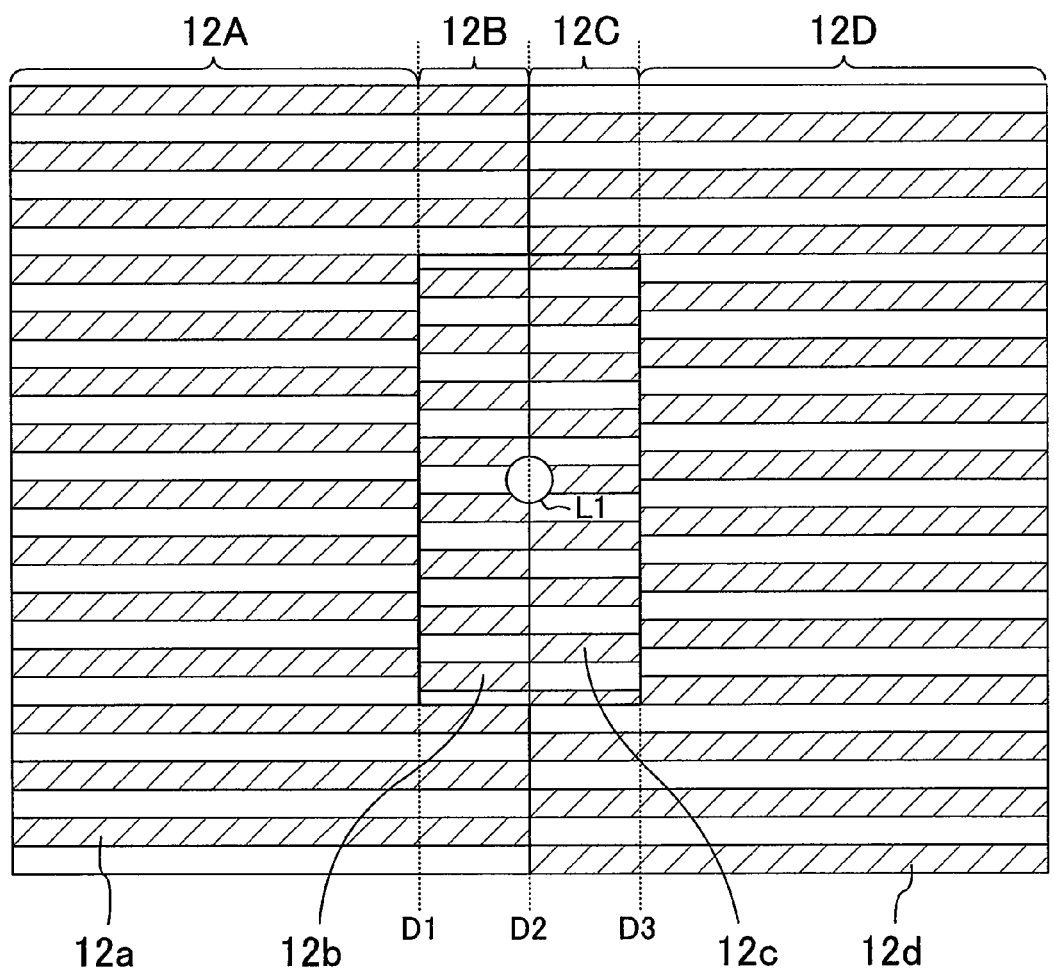
FIG. 11 is a plan view showing a modification of the diffraction grating of the optical pickup device according to the embodiment of the invention.

In this embodiment, the entire diffraction grating 12 is divided into the first region 12A, the second region 12B, the third region 12C, and the fourth region 12D. However, a region within an effective beam diameter range determined by the aperture diameter of the objective lens in the diffraction grating 12 need only be divided into the first to fourth regions, and the region outside the effective beam diameter range may have a different dividing state. For example, as shown in FIG. 11, the second region 12B and the second region 13B may not be formed in the region outside the effective beam diameter range.

In the example shown in this embodiment, the phase difference between the periodic structures of the first region 12A and the periodic structure of the second region 12B is 90 degrees and the phase difference between the periodic structure of the fourth region 12D and the periodic structure of the third region 12C is 90 degrees. However, the phase difference between the first region 12A and the second region 12B and the phase difference between the third region 12C and the fourth region 12D may be any value as long as the phase difference between the first region 12A and the fourth region 12D is substantially 180 degrees and the phase difference between the second region 12B and the third region 12C is substantially 180 degrees. In view of the manufacturing error of the periodic structure of the diffraction grating 12, however, the phase difference between the first region 12A and the second region 12B and the phase difference between the fourth region 12D and the third region 12C are preferably in the range of 10 degrees and 350 degrees, and more preferably in the range of 70 degrees and 290 degrees.

Figure 12:
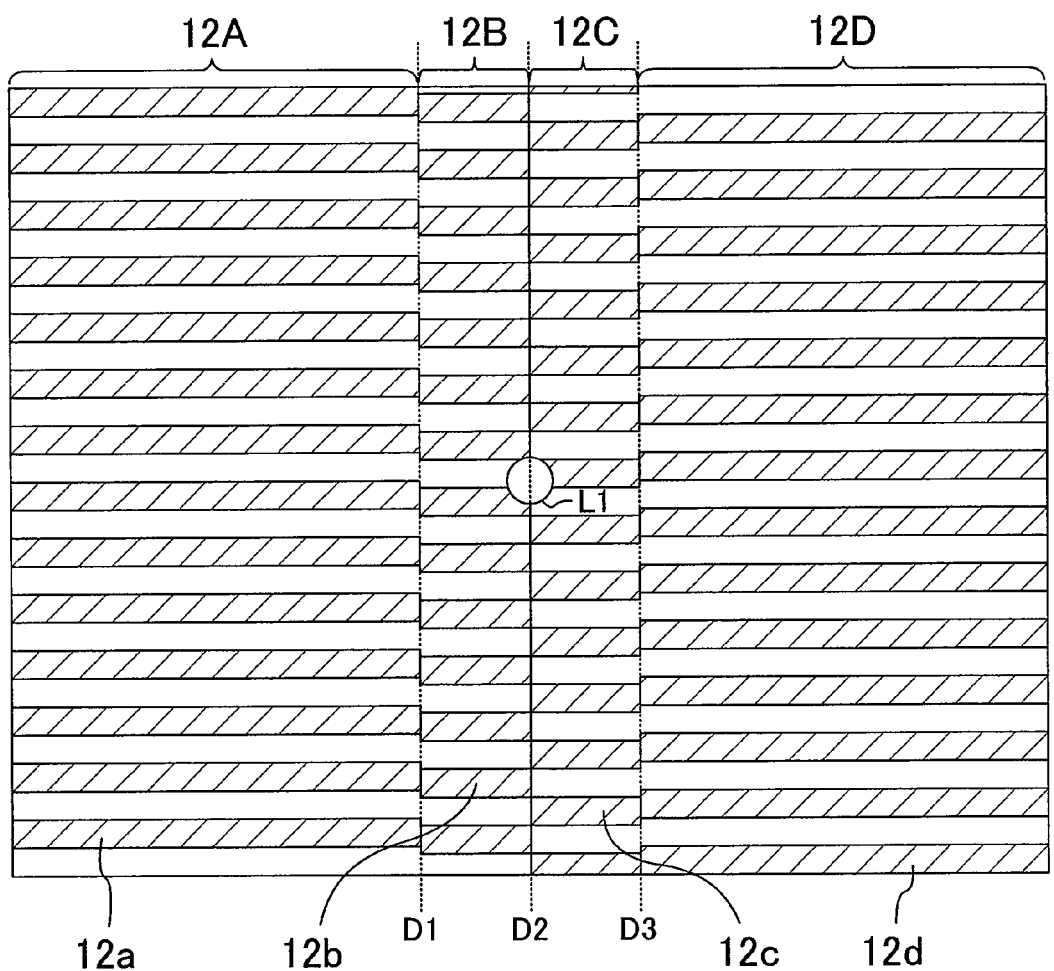
FIG. 12 is a plan view showing a modification of the diffraction grating of the optical pickup device according to the embodiment of the invention.
Figure 13:
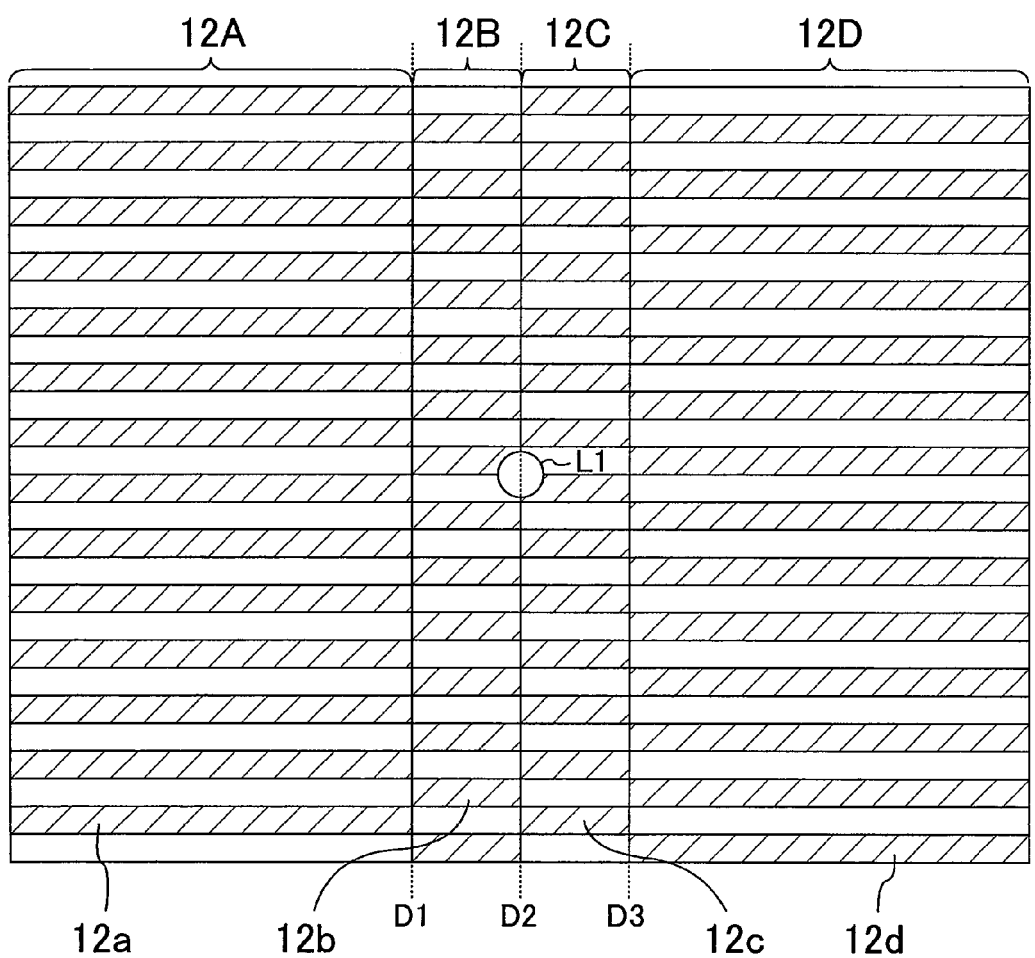
FIG. 13 is a plan view showing a modification of the diffraction grating of the optical pickup device according to the embodiment of the invention.

FIG. 12 shows an example in which the phase difference between the first region 12A and the fourth region 12D is substantially 180 degrees, the phase difference between the second region 12B and the third region 12C is substantially 180 degrees, and the phase difference between the first region 12A and the second region 12B and the phase difference between the fourth region 12D and the third region 12C are substantially 45 degrees. FIG. 13 shows an example in which the phase difference between the periodic structure of the first region 12A and the periodic structure of the fourth region 12D is substantially 180 degrees, the phase difference between the periodic structure of the second region 12B and the periodic structure of the third region 12C is substantially 180 degrees, and the phase difference between the first region 12A and the second region 12B and the phase difference between the fourth region 12D and the third region 12C are substantially 180 degrees. The same effects as those of the diffraction grating of FIG. 3 can be obtained in these cases as well.

Figure 14A:
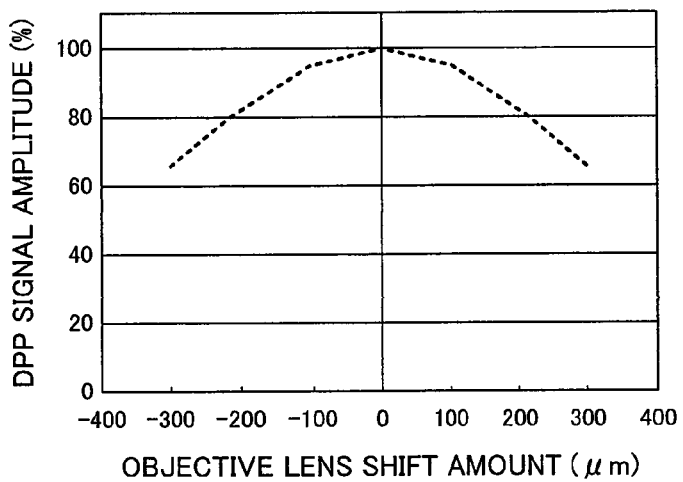
FIGS. 14A through 14C are graphs showing relations between the shift amount of an objective lens and variation in differential push-pull signal amplitude in the optical pickup device of the embodiment of the invention, wherein FIGS. 14A through 14C respectively show the case where the phase difference between first and second regions is 0 degrees, 90 degrees, and 180 degrees.
Figure 14B:
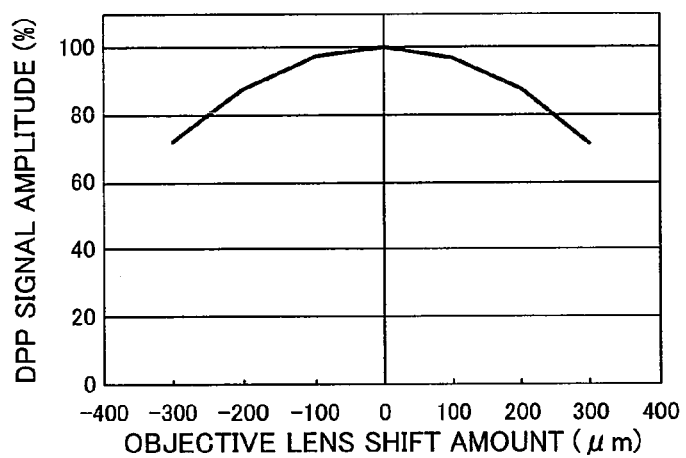
Figure 14C:
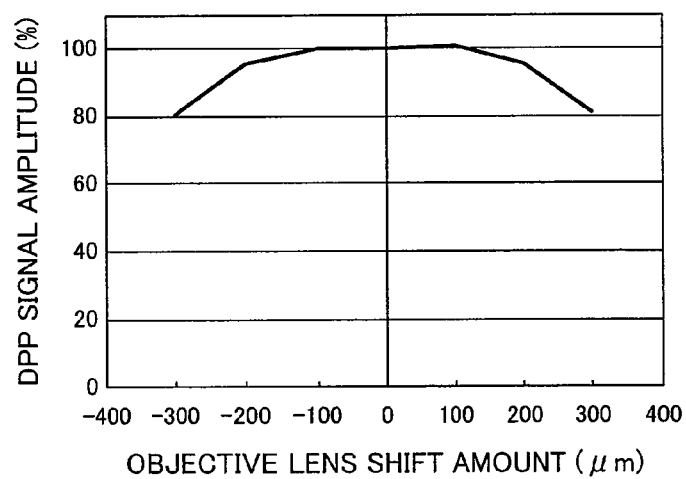

FIGS. 14A through 14C show relations between the shift amount of the objective lens 19 and the DPP signal amplitude in the case where a DVD-RAM is used as the optical information recording medium 51. FIGS. 14A through 14C show examples in which the phase difference between the first region 12A and the second region 12B is 0 degrees, 90 degrees, and 180 degrees, respectively. Note that, in FIGS. 14A through 14C, the ordinate shows the DPP signal amplitude normalized assuming that the DPP signal amplification value is 100% when the shift amount of the objective lens 19 is 0 μm. The phase difference between the periodic structure of the first region 12A and the periodic structure of the fourth region 12D is substantially 180 degrees and the phase difference between the periodic structure of the second region 12B and the periodic structure of the third region 12C is substantially 180 degrees.

As shown in FIG. 14, in the case where the phase difference between the periodic structure of the first region 12A and the periodic structure of the second region 12B is 0 degrees, the DPP signal amplitude changes more with shifting of the objective lens than in the case where the phase difference between the first region 12A and the second region 12B is 180 degrees.

Figure 15:
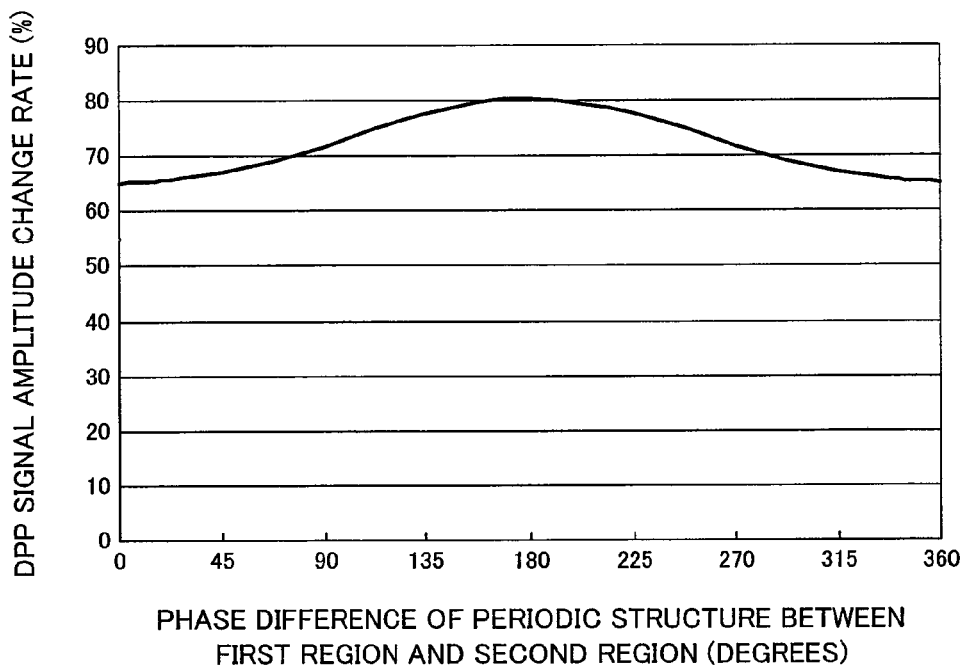
FIG. 15 is a graph showing a relation between the phase difference between first and second regions of the diffraction grating of the optical pickup device according to the embodiment of the invention and the change rate of differential push-pull signal amplitude.

FIG. 15 shows a relation between the phase difference between the first region 12A and the second region 12B and the change rate of DPP signal amplitude. The change rate of DPP signal amplitude is shown as a ratio of the DPP signal amplitude obtained when the shift amount of the objective lens is 300 μm to the DPP signal amplitude obtained when the shift amount of the objective lens is 0 μm.

As shown in FIG. 15, the change rate of DPP signal amplitude is closest to 100% when the phase difference between the periodic structure of the first region 12A and the periodic structure of the second region 12B is 180 degrees. The change rate of DPP signal amplitude decreases as the phase difference gets closer to 0 degrees or 360 degrees.

It is preferable in the optical pickup that the DPP signal amplitude is constant even if the objective lens is shifted. It is therefore more preferable that the change rate of DPP signal amplitude is closer to 100%. The phase difference between the periodic structure of the first region 12A and the periodic structure of the second region 12B can therefore be in the range of 10 degrees to 350 degrees. For more uniform DPP signal amplitude, however, it is preferable that the phase difference between the first region 12A and the second region 12B is in the range of 70 degrees to 290 degrees.

In order to reduce the change rate of DPP signal amplitude, it is preferable that a light beam that is effectively used includes a portion that has passed through the first region 12A of the diffraction grating 12, a portion that has passed through the second region 12B, a portion that has passed through the third region 12C, and a portion that has passed through the fourth portion 12D. In other words, it is preferable that a region of the diffraction grating 12 on which a range of the emitted light beam corresponding to the effective beam diameter determined by the aperture diameter of the objective lens 19 is incident includes the first region 12A through the fourth region 12D.

More specifically, in the case where the light source is a DVD-type light source, it is preferable that the sum of the width W1 of the second region 12B and the width W2 of the third region 12C of the diffraction grating 12, that is, the width (W1+W2), is in the range of 10% to 40% of the effective beam diameter determined by the aperture diameter of the objective lens 19. The effects obtained by this structure will now be described.

Figure 16:
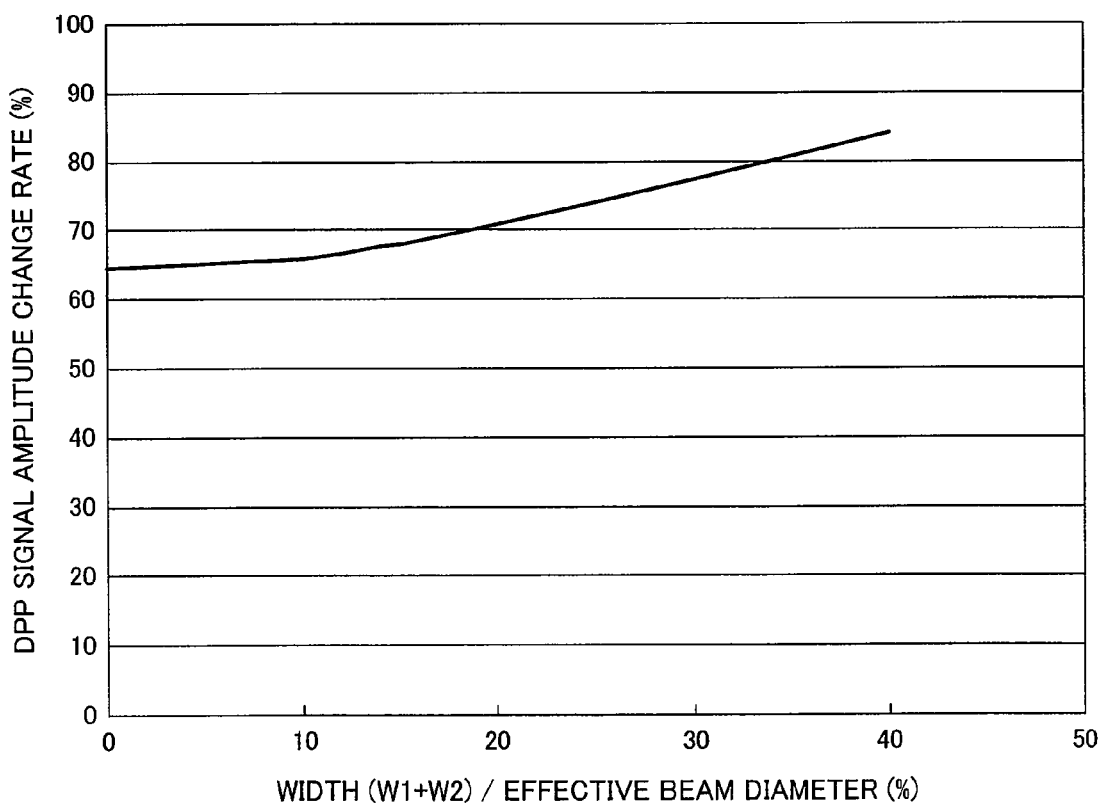
FIG. 16 is a graph showing a relation between the width of second and third regions of the diffraction grating of the optical pickup device according to the embodiment of the invention and the change rate of differential push-pull signal amplitude.

First, description will be given to the case where the width (W1+W2) is smaller than 10% of the effective beam diameter determined by the aperture diameter of the objective lens 19. FIG. 16 shows a relation between the change rate of DPP signal amplitude and the ratio of the width (W1+W2) to the effective beam diameter determined by the aperture diameter of the objective lens 19 in a DVD-RAM. Note that the change rate of DPP signal amplitude is shown as a ratio of the DPP signal amplitude obtained when the shift amount of the objective lens is 300 μm to the DPP signal amplitude obtained when the shift amount of the objective lens is 0 μm. As shown in FIG. 16, when the width (W1+W2) is smaller than 10% of the effective beam diameter determined by the aperture diameter of the objective lens 19, the change rate of DPP signal amplitude is smaller than 66%. The DPP signal amplitude thus decreases by 34% or more of the DPP signal amplitude obtained when the shift amount of the objective lens is 0 μm. Such a large change in DPP signal amplitude is not preferable.

Figure 17:
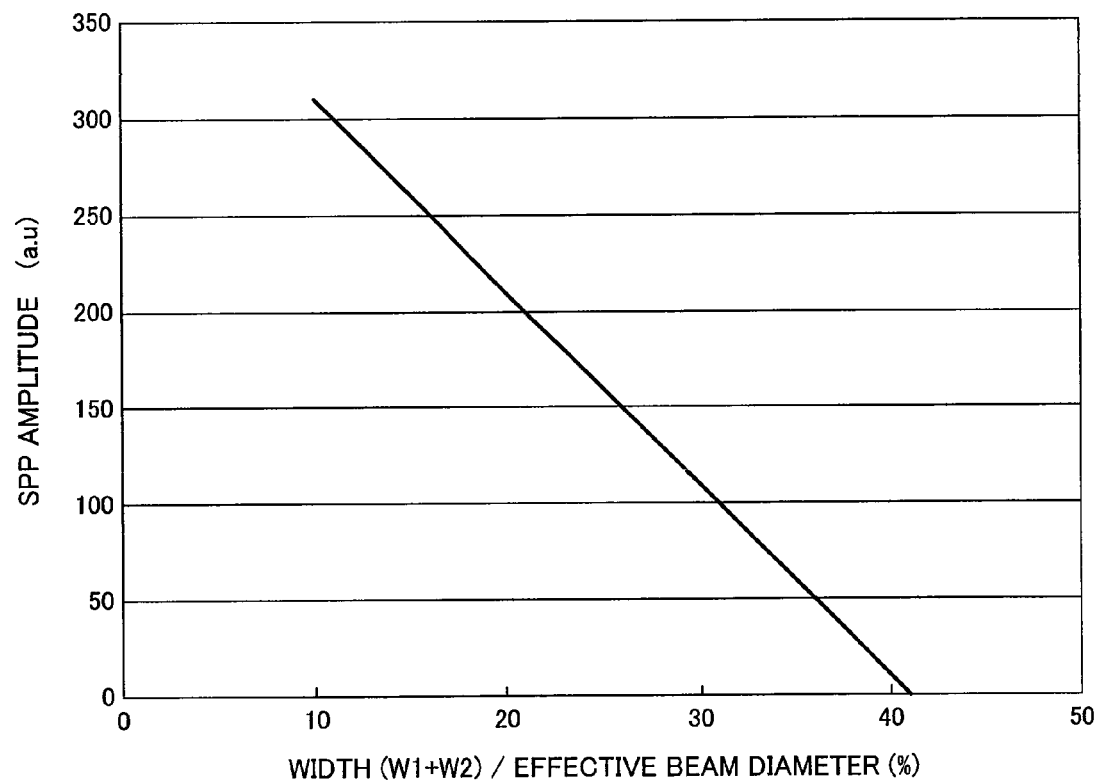
FIG. 17 is a graph showing a relation between the width of the second and third regions of the diffraction grating of the optical pickup device according to the embodiment of the invention and the push-pull signal amplitude.
Figure 18:
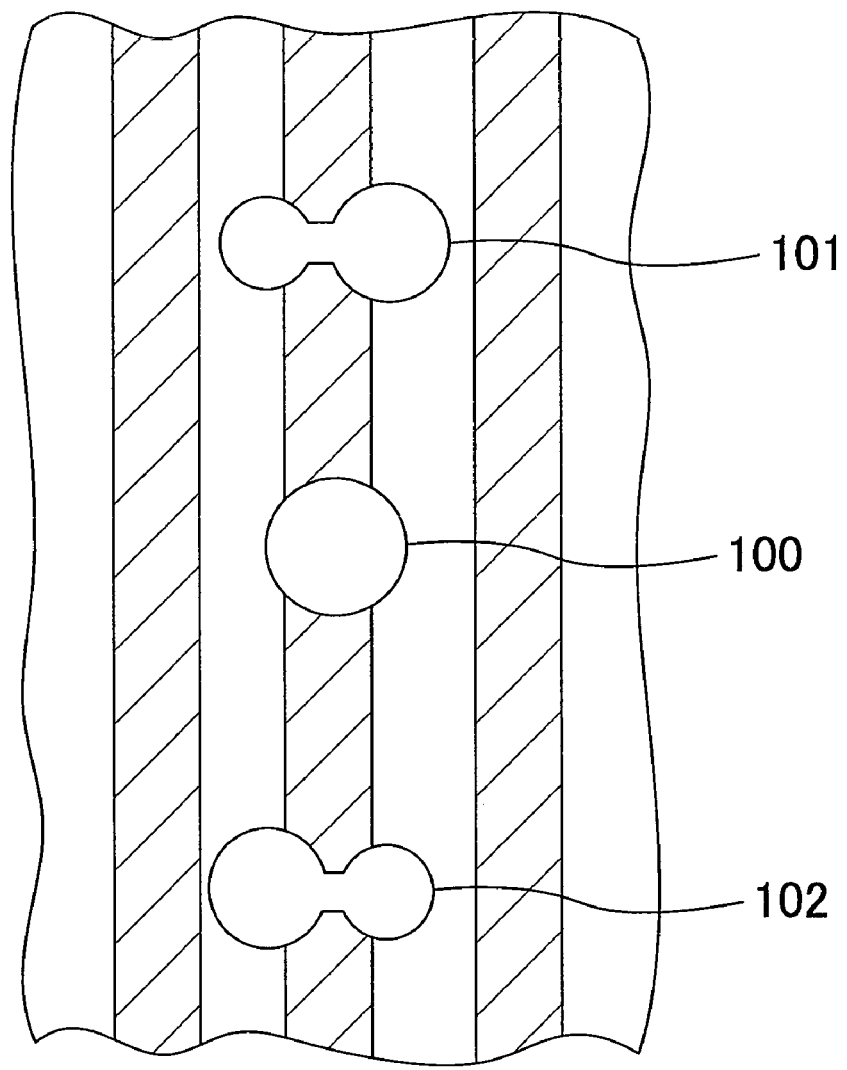
FIG. 18 is a plan view showing the shapes of convergence spots formed on a recording surface of an optical information recording medium by a conventional optical pickup device.
Figure 19:
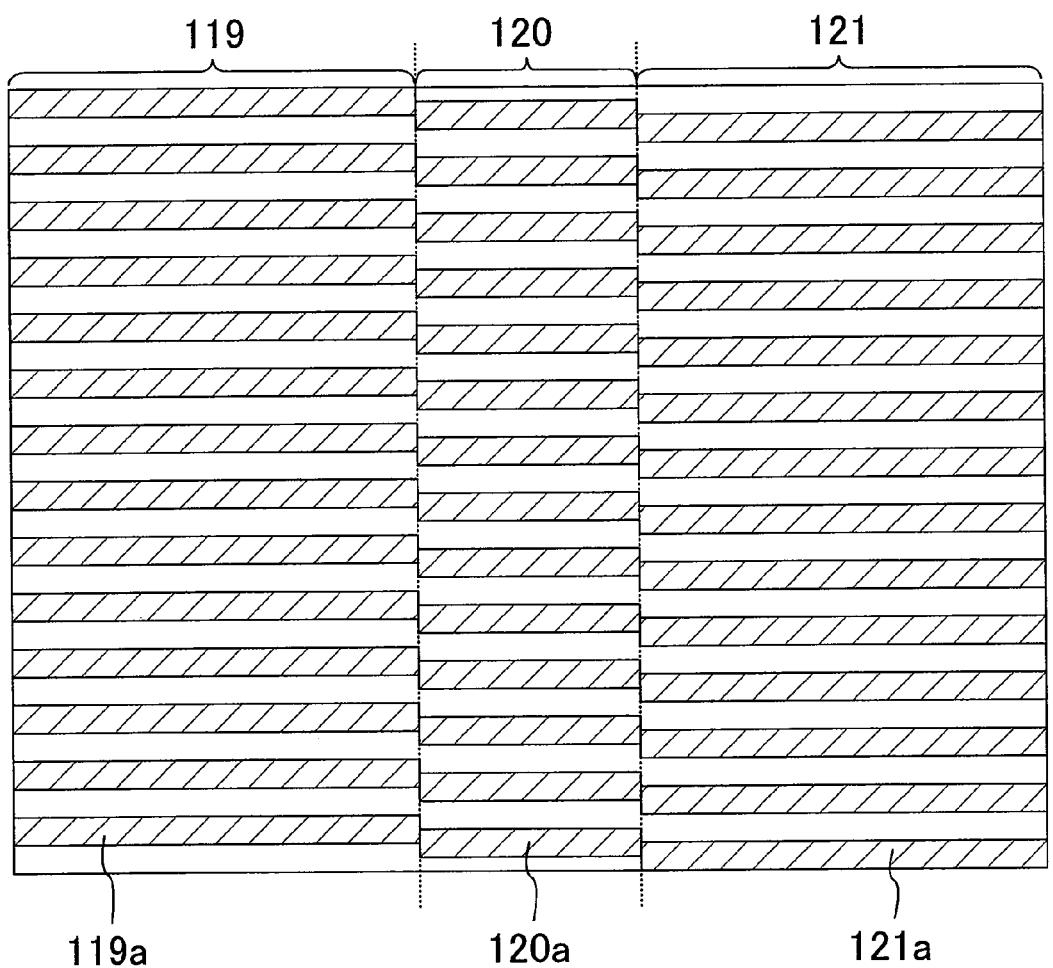
FIG. 19 is a plan view of a diffraction grating of the conventional optical pickup device.
Figure 20:
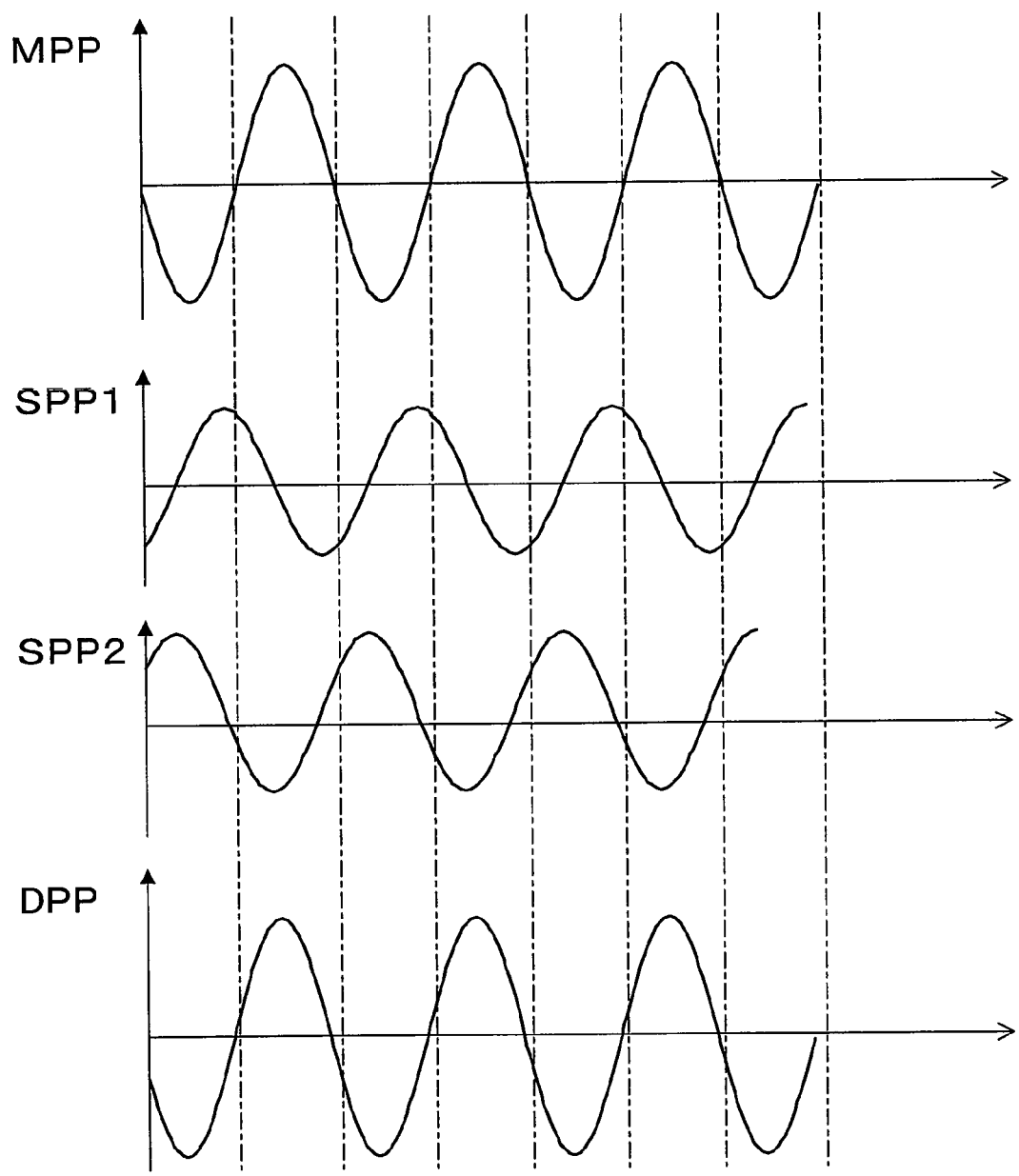
FIG. 20 is a graph showing signal waveforms obtained by the conventional optical pickup device.

Next, description will be given to the case where the width (W1+W2) is larger than 40% of the effective beam diameter determined by the aperture diameter of the objective lens 19. FIG. 17 shows a relation between the sum (SPP amplitude) of signal amplitude of the push-pull signal SPP1 and signal amplitude of the push-pull signal SPP2 and the ratio of the width (W1+W2) to the effective beam diameter determined by the aperture diameter of the objective lens 19. As shown in FIG. 17, when the width (W1+W2) is larger than 40% of the effective beam diameter determined by the aperture diameter of the objective lens 19, the signal amplitude becomes closer to 0. Since the absolute value of the signal amplitude is reduced, characteristics of the optical pickup device are degraded.

It is therefore preferable that the width (W1+W2) is in the range of 10% to 40% of the effective beam diameter determined by the aperture diameter of the objective lens.

When two light sources of DVD-type and CD-type are used, it is preferable that the width (W1+W2), that is, the sum of the width W1 of the second region 12B and the width W2 of the third region 12C of the diffraction grating 12, is in the range of 10% to 35% of the DVD effective beam diameter determined by the aperture diameter of the objective lens 19.

As has been described above, the optical pickup device of this embodiment can be used for various optical information recording media having different guide groove pitches and achieves tracking error signal detection that enables more stable recording and playback. In other words, the optical pickup device of this embodiment can implement size reduction, simplification, cost reduction, improved efficiency, and the like in DVD- and CD-type recording devices and playback devices. Moreover, the optical pickup device of this embodiment is very useful as an optical pickup device having a signal detection function such as a playback signal, a recording signal, and various servo signals which are used in an optical head device that serves as a main part of an optical information processor for performing processing, such as recording, playback, and erasure of information, on an optical information recording medium such as an optical disc.

INDUSTRIAL APPLICABILITY

The invention can implement an optical pickup device for performing stable tracking error detection on a plurality of optical information recording media having different guide groove pitches while maintaining the advantages of the in-line DPP method. The optical pickup device of the invention is useful as, for example, an optical pickup device that is used in an optical information processor for performing processing such as recording of information onto an optical information recording medium and playback or erasure of information recorded on an optical information recording medium.

The invention claimed is:

1. An optical pickup device for recording information onto an optical information recording medium and reading and erasing information recorded on the optical information recording medium, comprising:
   a light source;
   a diffraction grating for separating a light beam emitted from the light source into at least three light beams; and
   a photodetector for receiving the separated light beams reflected from the optical information recording medium, wherein
   the diffraction grating is divided into a first region, a second region, a third region, and a fourth region having periodic structures of different phases from one another by dividing lines extending in a direction parallel to a tangential direction of tracks of the optical information recording medium,
   the second region and the third region are located between the first region and the fourth region sequentially from the first region side,
   the periodic structure of the second region has a phase difference of approximately 180 degrees from the periodic structure of the third region, and
   the periodic structure of the first region has a phase difference of approximately 180 degrees from the periodic structure of the fourth region.

2. The optical pickup device according to claim 1, wherein a +$1^{st}$ order diffracted light beam that has passed through the first region has a phase difference of 80 degrees to 100 degrees from a +$1^{st}$ order diffracted light beam that has passed through the second region.

3. The optical pickup device according to claim 1, wherein a +$1^{st}$ order diffracted light beam that has passed through the first region has a phase difference of 35 degrees to 55 degrees from a +$1^{st}$ order diffracted light beam that has passed through the second region.

4. The optical pickup device according to claim 1, wherein a distance between the dividing line dividing the first region and the second region from each other and the dividing line dividing the second region and the third region from each other is equal to a distance between the dividing line dividing the second region and the third region from each other and the dividing line dividing the third region and the fourth region from each other.

5. The optical pickup device according to claim 1, wherein a plurality of guide grooves are periodically formed on a recording surface of the optical information recording medium, and each of the light beams is converged on one of the plurality of guide grooves.

6. The optical pickup device according to claim 1, further comprising an arithmetic processing circuit for detecting a tracking error signal by a differential push-pull method based on an output signal of the photodetector.

7. The optical pickup device according to claim 1, wherein the photodetector includes at least three light receiving elements respectively corresponding to the reflected light beams, and each of the light receiving elements is divided into a plurality of light receiving regions.

8. The optical pickup device according to claim 1, wherein a center of the light beam emitted from the light source is positioned in the second region or the third region.

9. The optical pickup device according to claim 1, further comprising an objective lens for converging the at least three light beams onto a recording surface of the optical information recording medium as independent convergence spots, wherein a region of the diffraction grating on which a range of the emitted light beam corresponding to an effective beam diameter determined by an aperture diameter of the objective lens is incident includes the first region, the second region, the third region, and the fourth region.

10. The optical pickup device according to claim 9, wherein a sum of a width of the second region and a width of the third region is in a range of 10% to 40% of the effective beam diameter.

* * * * *